US012744824B2

(12) United States Patent
Prabhakar et al.

(10) Patent No.: US 12,744,824 B2
(45) Date of Patent: Sep. 22, 2026

(54) METHODS TO OPTIMIZE SIMULTANEOUS VOICE AND DATA EXPERIENCE IN CELLULAR NETWORKS

(71) Applicant: Apple Inc., Cupertino, CA (US)

(72) Inventors: Alosious Pradeep Prabhakar, Singapore (SG); Hongjun Wang, Singapore (SG); Vijay Venkataraman, San Jose, CA (US)

(73) Assignee: Apple Inc., Cupertino, CA (US)

(*) Notice: Subject to any disclaimer, the term of this patent is extended or adjusted under 35 U.S.C. 154(b) by 446 days.

(21) Appl. No.: 18/391,218

(22) Filed: Dec. 20, 2023

(65) Prior Publication Data

US 2024/0223620 A1 Jul. 4, 2024

Related U.S. Application Data

(60) Provisional application No. 63/478,278, filed on Jan. 3, 2023.

(51) Int. Cl.

*H04L 65/1016* (2022.01)
*H04L 65/1069* (2022.01)
*H04L 65/1073* (2022.01)
*H04W 84/04* (2009.01)

(52) U.S. Cl.

CPC ...... *H04L 65/1016* (2013.01); *H04L 65/1069* (2013.01); *H04L 65/1073* (2013.01); *H04W 84/042* (2013.01)

(58) Field of Classification Search

CPC ............. H04L 65/1016; H04L 65/1069; H04L 65/1073; H04L 65/1095
See application file for complete search history.

(56) References Cited

U.S. PATENT DOCUMENTS

2021/0051530 A1* 2/2021 Venkataraman ...... H04W 76/12
2023/0379368 A1* 11/2023 Yang .................. H04L 65/1016

* cited by examiner

*Primary Examiner* — Sam Bhattacharya
(74) *Attorney, Agent, or Firm* — Blank Rome LLP

(57) ABSTRACT

Optimizations for simultaneous voice and data experiences in cellular networks include methods of handling voice call fallback, e.g.: (1) on VoNR when an IMS PDU session is established but an Internet PDU session is not yet established; (2) on VoNR when IMS and Internet PDU sessions are established in different network slices; (3) on VoNR when an IMS PDU session is established but a rejection is received for an Internet PDU session; (4) on an LTE network after an EPSFB procedure when an IMS bearer is not present; (5) on an LTE network after an EPSFB procedure when an IMS bearer is present but an Internet bearer is not; (6) on VoNR when a network does not support simultaneous voice and data; (7) when a VoNR-capable UE is camped to SA on a VPLMN; and (8) when a non-VoNR-capable UE is camped to SA on a network that supports VoNR.

20 Claims, 23 Drawing Sheets

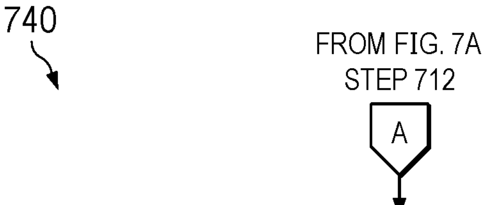

AFTER EXPIRY OF A FIRST TIMER:

IF ANY OF THE BELOW CONDITIONS ARE MET:
(a) THE PROXIMITY SENSOR IS ACTIVATED AND THE DISPLAY SCREEN IS INACTIVE;
(b) THE DISPLAY SCREEN IS LOCKED;
(c) THE DISPLAY SCREEN IS UNLOCKED AND THE TERMINAL IS NOT UTILIZING ANY APPLICATIONS THAT REQUIRE PACKET-SWITCHED (PS) DATA; OR
(d) THE VOICE CALL IS FROM OR TO A DESIGNATED FAVORITE CONTACT OF A USER OF THE TERMINAL:

THEN:
RE-SEND A PDU SESSION REQUEST FOR THE INTERNET DNN; AND
PROCEED WITH THE VOICE CALL USING THE VoNR PROTOCOL

ELSE:
FALL BACK TO COMPLETE THE VOICE CALL OVER A LONG-TERM EVOLUTION (LTE) NETWORK USING A VOICE OVER LTE (VoLTE) PROTOCOL

IF INTERNET PDU SESSION IS SETUP BEFORE EXPIRY OF FIRST TIMER:
PROCEED WITH THE VOICE CALL USING THE VoNR PROTOCOL

FIG. 7B

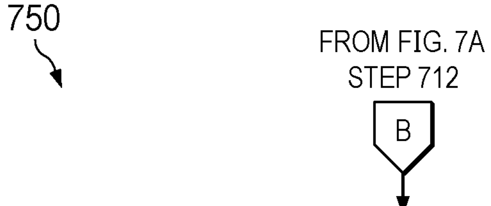

IF REJECT 5GSM CAUSE CODE = 26, 36, 39:
CHECK THE VALUE OF BACK-OFF TIMER IN PDU REJECT MESSAGE

IF BACK-OFF TIMER HIGHER THAN A FIRST TIMER VALUE, "T":

THEN:
RE-SEND A PDU SESSION REQUEST FOR THE INTERNET DNN AFTER EXPIRY OF THE FIRST TIMER; AND
PROCEED WITH THE VOICE CALL USING THE VoNR PROTOCOL

ELSE:
DO NOT WAIT UNTIL BACK-OFF TIMER EXPIRES
FALL BACK TO COMPLETE THE VOICE CALL OVER AN LTE NETWORK USING A VoLTE PROTOCOL IMMEDIATELY, REGARDLESS OF THE BACK-OFF TIMER VALUE

ELSE (i.e., IN THE CASE OF ALL OTHER REJECT 5GSM CAUSE CODES):
FALL BACK TO COMPLETE THE VOICE CALL OVER AN LTE NETWORK USING A VoLTE PROTOCOL IMMEDIATELY, REGARDLESS OF THE BACK-OFF TIMER VALUE.

EXAMPLE CAUSE CODES:
CAUSE 26 = INSUFFICIENT RESOURCES
CAUSE 36 = REGULAR DEACTIVATION
CAUSE 39 = REACTIVATION REQUESTED

FIRST TIMER VALUE "T" IS A UE-SIDE CONFIGURABLE VALUE. BEST CASE SCENARIO IS "T" IS LESS THAN T3580

FIG. 7C

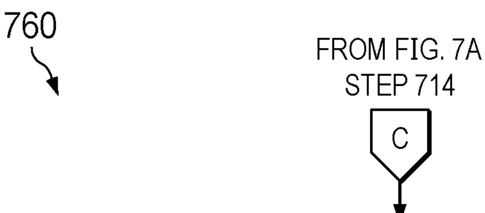

IF ANY OF THE BELOW CONDITIONS ARE MET:

(a) THE PROXIMITY SENSOR IS ACTIVATED AND THE DISPLAY SCREEN IS INACTIVE;

(b) THE DISPLAY SCREEN IS LOCKED;

(c) THE DISPLAY SCREEN IS UNLOCKED AND THE TERMINAL IS NOT UTILIZING ANY APPLICATIONS THAT REQUIRE PS DATA; OR (d) THE VOICE CALL IS FROM OR TO A DESIGNATED FAVORITE CONTACT OF A USER OF THE TERMINAL:

THEN:

RELEASE THE INTERNET PDU SESSION;

COMPLETE SET UP OF THE IMS PDU SESSION; AND

PROCEED WITH THE VOICE CALL USING THE VoNR PROTOCOL

ELSE:

FALL BACK TO COMPLETE THE VOICE CALL OVER AN LTE NETWORK USING A VoLTE PROTOCOL

*IN ANY CASE, IF THE USER INITIATES PACKET SWITCHED (PS) DATA DURING THE VoNR CALL, INITIATE A FALLBACK MECHANISM TO SUPPORT MRAB.

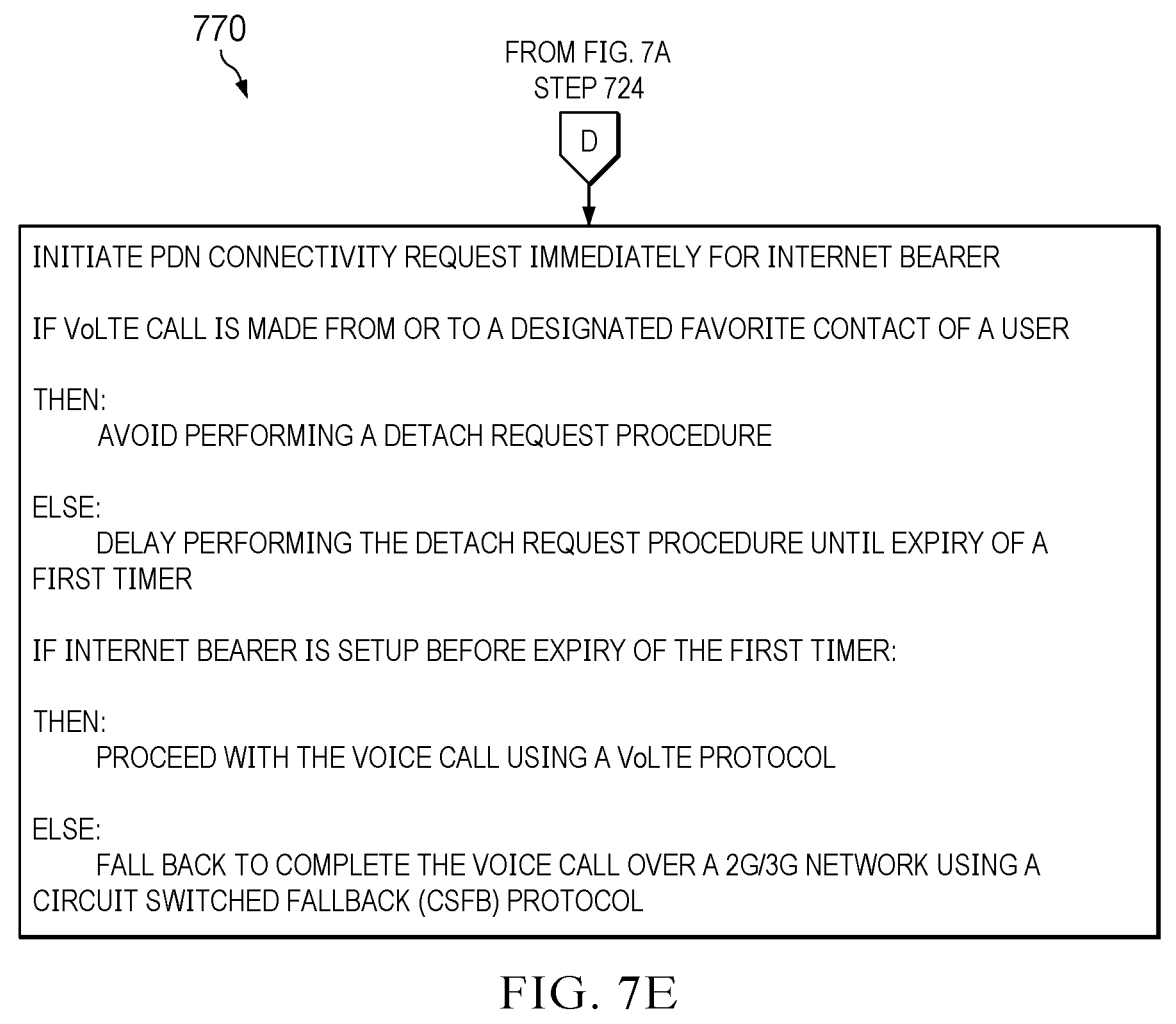

FROM FIG. 7A
STEP 724

D

INITIATE PDN CONNECTIVITY REQUEST IMMEDIATELY FOR INTERNET BEARER

IF VoLTE CALL IS MADE FROM OR TO A DESIGNATED FAVORITE CONTACT OF A USER

THEN:
AVOID PERFORMING A DETACH REQUEST PROCEDURE

ELSE:
DELAY PERFORMING THE DETACH REQUEST PROCEDURE UNTIL EXPIRY OF A FIRST TIMER

IF INTERNET BEARER IS SETUP BEFORE EXPIRY OF THE FIRST TIMER:

THEN:
PROCEED WITH THE VOICE CALL USING A VoLTE PROTOCOL

ELSE:
FALL BACK TO COMPLETE THE VOICE CALL OVER A 2G/3G NETWORK USING A CIRCUIT SWITCHED FALLBACK (CSFB) PROTOCOL

FIG. 7E

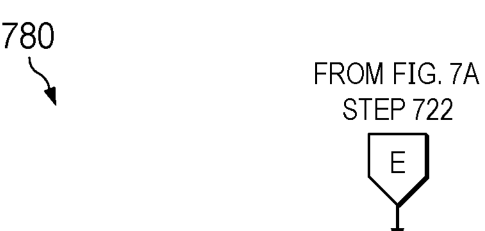

FOR A MOBILE ORIGINATED (MO) CALL:

INITIATE A PDN CONNECTIVITY REQUEST TO SETUP AN IMS BEARER

WAIT A CONFIGURABLE AMOUNT OF TIME AFTER THE IMS BEARER REQUEST IS INITIATED TO DETERMINE IF A BEARER PROCEDURE IS INITIATED BY THE LTE NETWORK

IF THE BEARER IS SETUP:

THEN:

PROCEED WITH THE VOICE CALL USING A VoLTE PROTOCOL

ELSE:

FALL BACK TO COMPLETE THE VOICE CALL OVER A 2G/3G NETWORK USING A CIRCUIT SWITCHED FALLBACK (CSFB) PROTOCOL

FOR A MOBILE TERMINATED (MT) CALL:

FALL BACK TO COMPLETE THE VOICE CALL OVER A 2G/3G NETWORK USING A CSFB PROTOCOL (AS THE UE WOULD NOT KNOW OF THE NETWORK'S PAGING RETRY MECHANISM AFTER SETTING UP THE IMS BEARER)

FIG. 7F

METHODS TO OPTIMIZE SIMULTANEOUS VOICE AND DATA EXPERIENCE IN CELLULAR NETWORKS

TECHNICAL FIELD

The present application relates to wireless devices and wireless networks, including user devices, terminals, circuits, computer-readable media, and methods for optimizing simultaneous voice and data experiences in cellular networks across a broad range of scenarios.

BACKGROUND

Wireless communication systems are rapidly growing in usage. In recent years, wireless devices such as smart phones and tablet computers have become increasingly sophisticated. In addition to supporting telephone calls, many mobile devices now provide access to the Internet, email, text messaging, and navigation using the global positioning system (GPS) and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), Long-Term Evolution (LTE), LTE Advanced (LTE-A), HSPA, 3GPP2 CDMA2000 (e.g., 1×RTT, 1×EV-DO, HRPD, eHRPD), IEEE 802.11 (WLAN or Wi-Fi), and BLUETOOTH™, among others.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including the fifth generation (5G) standard and New Radio (NR) communication technologies. Accordingly, improvements in the field in support of such development and design are desired.

In particular, simultaneous voice and data services are often desired on 5G NR networks. However, first, a user equipment (UE) terminal must register with the NR network. When a UE performs registration in NR, the UE may need at least two Protocol Data Unit (PDU) sessions for performing default activities. A "PDU Session" is essentially the new abstraction for 5G user plane services, analogous to the concept of a Packet Data Network (PDN) connection in 4G Evolved Packet Core (EPC). A PDU Session provides connectivity between applications on a UE and a data network. For example, a PDU Session 1 may be set up for so-called "Internet" services, i.e., used for any data-related activity (e.g., browsing the Internet, using a social media application, etc.). Similarly, a PDU Session 2 may be set up for so-called IP Multimedia Subsystem (IMS) services, e.g., multimedia services such as Short Message Service (SMS) messages, Session Initiation Protocol (SIP) signaling, Real-time Transport Protocol (RTP) packets flow, Voice over New Radio (VoNR), Evolved Packet System Fallback (EPSFB), etc. A PDU Session Establishment request and response procedure may be used to setup the abovementioned Internet and IMS PDU Sessions. A 5GSM timer may also be associated with PDU Session Establishment, which currently has an expiry value of 16 seconds in 3GPP 24.501.

Similarly, if a UE attempts to perform an Attach procedure with an LTE network, UE may need at least two PDN sessions for performing default activities. For example, a PDN Session 1 may be set up for "Internet" services, i.e., used for any data-related activity (e.g., browsing the Internet, using a social media application, etc.). Similarly, a PDN Session 2 may be set up for IMS services, e.g., SMS, Session Initiation Protocol (SIP) signaling, Real-time Transport Protocol (RTP) packets flow, etc. A PDN Connectivity request and response procedure may be used to setup the above-mentioned Internet and IMS PDN Sessions. A 5GSM timer may also be associated with PDN Connectivity Requests, which currently has an expiry value of 8 seconds in 3GPP 24.301.

Once UE registration is complete, there is a need to improve the provision of simultaneous voice and data services in various kinds of cellular networks, especially in scenarios when one or more PDU (or PDN) sessions are not successfully established by the UE and/or when one or more fallback mechanisms are utilized by the network to attempt to avoid call drops, data loss, or other poor user experiences.

SUMMARY

In accordance with one or more embodiments, a terminal is disclosed comprising: a receiver; a proximity sensor; a display screen; and a processor configured to: initiate or receive a voice call over a New Radio (NR) network using a Voice over New Radio (VoNR) protocol; and in response to: (1) an IP Multimedia Subsystem (IMS) Protocol Data Unit (PDU) session being successfully established; (2) an Internet PDU session not being successfully established before expiry of a first timer; and (3) a PDU session request rejection not being received for an Internet Data Network Name (DNN) after expiry of the first timer: falling back to complete the voice call over a Long-Term Evolution (LTE) network using a Voice over LTE (VoLTE) protocol, unless at least one of the following conditions is met: (a) the proximity sensor is activated and the display screen is inactive; (b) the display screen is locked; (c) the display screen is unlocked and the terminal is not utilizing any applications that require packet-switched (PS) data; or (d) the voice call is from or to a designated favorite contact (e.g., contacts explicitly marked as favorites by a user, contacts that a user has added as an emergency contact, etc.) of a user of the terminal.

In accordance with one or more other embodiments, a terminal is disclosed, comprising: a receiver; a proximity sensor; a display screen; and a processor configured to: initiate or receive a voice call over an NR network using a VoNR protocol, wherein the NR network supports NSSRG, wherein an established Internet PDU session and an established IMS PDU session belong to different network slices, and wherein the Internet PDU session and the IMS PDU session are not compatible to work simultaneously; and fall back to complete the voice call over an LTE network using a VoLTE protocol, unless at least one of the following conditions is met: (a) the proximity sensor is activated and the display screen is inactive; (b) the display screen is locked; (c) the display screen is unlocked and the terminal is not utilizing any applications that require PS data; or (d) the voice call is from or to a designated favorite contact of a user of the terminal.

In accordance with one or more other embodiments, a terminal is disclosed, comprising: a receiver; and a processor configured to: initiate or receive a voice call over an NR network using a VoNR protocol; and in response to: (1) an IMS PDU session being successfully established; (2) an Internet PDU session not being successfully established before expiry of a first timer; and (3) a PDU session request rejection being received for an Internet DNN: falling back to complete the voice call over an LTE network using a VoLTE protocol, unless the following conditions are met: (a) a 5G Session Management (5GSM) reject cause code of 26, 36, or 39 is received at the terminal; and (b) a back-off timer value in the PDU session request rejection exceeds a first timer value.

In accordance with one or more other embodiments, a terminal is disclosed, comprising: a receiver; and a processor configured to: initiate or receive a voice call over an NR network; fall back to complete the voice call over an LTE network using an Evolved Packet System Fallback (EPSFB) protocol; and in response to an IMS bearer not being present in a Tracking Area Update (TAU) Accept message received at the terminal: if the terminal is initiating the voice call: (1) initiate a PDN Connectivity Request to setup a bearer (e.g., a dedicated bearer); and (2) proceed with the voice call using a VoLTE protocol if the bearer is set up; or if the terminal is receiving the voice call: (3) fall back to complete the voice call over a 2G/3G network using a Circuit Switched Fallback (CSFB) protocol.

In accordance with one or more other embodiments, a terminal is disclosed, comprising: a receiver; and a processor configured to: initiate or receive a voice call over an NR network; fall back to complete the voice call over an LTE network using an EPSFB protocol; and in response to an IMS bearer being present and an Internet bearer not being present in a TAU Accept message received at the terminal: (1) initiate a PDN Connectivity Request to setup an Internet bearer; (2a) proceed with the voice call using a VoLTE protocol if the Internet bearer is set up before expiry of a first timer (e.g., a T3842 timer); and (2b) fall back to complete the voice call over a 2G/3G network using a CSFB protocol if the Internet bearer is not set up before expiry of the first timer.

In accordance with one or more other embodiments, a terminal is disclosed, comprising: a receiver; a receiver; and a processor configured to: register as a VoNR-capable terminal with a Standalone (SA) NR network; establish an IMS PDU session and an Internet PDU session with the SA NR network; initiate or receive a voice call over the SA NR network; and fall back to complete the voice call over an LTE network using a VoLTE protocol if the following condition is met: (a) the SA NR network does not support simultaneous usage of voice and data services. In some examples, if the SA NR supports simultaneous usage of voice and data services, the processor is further configured to fall back to complete the voice call over the LTE network using a VoLTE protocol if the following conditions are met: (b) the SA NR network does not support VoNR and New Radio Carrier Aggregation (NR-CA); (c) the LTE network does support VoLTE and either a Long-Term Evolution Carrier Aggregation (LTE-CA) mode or a Non-Standalone (NSA) mode; and (d) a Primary Cell (PCell) available bandwidth in the SA NR network is less than an overall available bandwidth in either the LTE-CA mode or the NSA mode.

In accordance with one or more other embodiments, a terminal is disclosed, comprising: a receiver; and a processor configured to: register as a VoNR-capable terminal with a SA NR network Visiting Public Land Mobile Network (VPLMN); establish an IMS PDU session and an Internet PDU session with the SA NR network; initiate or receive a voice call over the SA NR network; and fall back to complete the voice call over an LTE network using a VoLTE protocol if the following conditions are met: (a) the terminal is experiencing data throttling from the SA NR network; and (b) the terminal is not aware of any other VPLMNs that support data and voice in the same Radio Access Technology (RAT).

In accordance with one or more other embodiments, a terminal is disclosed, comprising: a receiver; and a processor configured to: register as a non-VoNR-capable terminal with a SA NR network; establish an IMS PDU session and an Internet PDU session with the SA NR network; initiate or receive a voice call over an LTE network using an EPSFB protocol; receive, from the SA NR network, a PDU Session Modification command to attempt to setup the voice call as a VoNR voice call; and ignore the PDU Session Modification command and proceed to complete the voice call over the LTE network using a VoLTE protocol.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter may be obtained when the following detailed description of various aspects is considered in conjunction with the following drawings:

FIG. 7B illustrates a flow diagram providing additional details for a method of handling voice call fallback on VoNR when an IMS PDU session is established but an Internet PDU session is not established, according to some aspects.

FIG. 7C illustrates a flow diagram providing additional details for a method of handling voice call fallback on VoNR when an IMS PDU session is established but an Internet PDU session is not established, according to some aspects.

FIG. 7D illustrates a flow diagram providing additional details for a method of handling voice call fallback on VoNR when an IMS PDU session and an Internet PDU session are established in different network slices but are not compatible to work simultaneously, according to some aspects.

FIG. 7E illustrates a flow diagram providing additional details for a method of handling voice call fallback on an LTE network after an EPSFB procedure has occurred and an IMS bearer is present but an Internet bearer is not present, according to some aspects.

FIG. 7F illustrates a flow diagram providing additional details for a method of handling voice call fallback on an LTE network after an EPSFB procedure has occurred and an IMS bearer is not present, according to some aspects.

Figure 1:
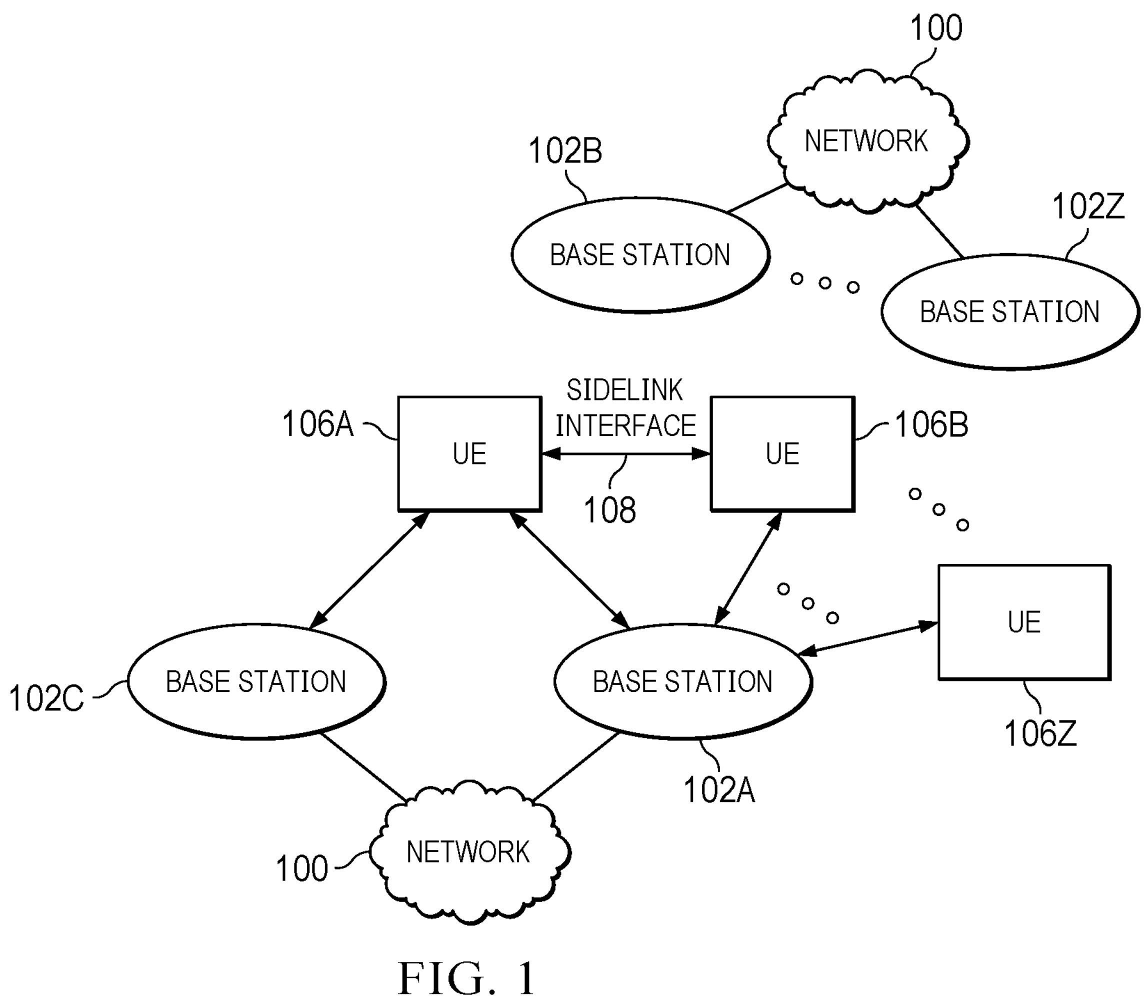
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

There is a need to study enhancements to simultaneous voice and data service quality in mobile devices. The evolution of the 5G and New Radio (NR) standards need to continuously improve network efficiency and behavior for user equipment (UE) devices and base station (BS) devices. Improvements are needed in terms of both Standalone (SA) 5G implementations and fallback (FB) procedures.

In one or more embodiments described herein, improvements are disclosed for cellular networks, including methods of handling voice call fallback in various scenarios, such as: (1) on VoNR when an IMS PDU session is established but an Internet PDU session is not yet established; (2) on VoNR when IMS and Internet PDU sessions are established in different network slices; (3) on VoNR when an IMS PDU session is established but a rejection is received for an Internet PDU session; (4) on an LTE network after an EPSFB procedure when an IMS bearer is not present; (5) on an LTE network after an EPSFB procedure when an IMS bearer is present but an Internet bearer is not present; (6) on VoNR when a network does not support simultaneous voice and data services; (7) when a VoNR-capable UE is camped to SA on a VPLMN; and (8) when a non-VoNR-capable UE is camped to SA on a network that supports VoNR.

The following is a glossary of additional terms that may be used in this disclosure:

Memory Medium—Any of various types of non-transitory memory devices or storage devices. The term "memory medium" is intended to include an installation medium, (e.g., a CD-ROM, floppy disks, or tape device; a computer system memory or random-access memory such as DRAM, DDR RAM, SRAM, EDO RAM, Rambus RAM), a non-volatile memory such as a Flash, magnetic media (e.g., a hard drive, or optical storage; registers, or other similar types of memory elements). The memory medium may include other types of non-transitory memory as well or combinations thereof. In addition, the memory medium may be located in a first computer system in which the programs are executed or may be located in a second different computer system which connects to the first computer system over a network, such as the Internet. In the latter instance, the second computer system may provide program instructions to the first computer for execution. The term "memory medium" may include two or more memory mediums which may reside in different locations (e.g., in different computer systems that are connected over a network). The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

User Equipment (UE) (also "User Device," "UE Device," or "Terminal")—any of various types of computer systems or devices that are mobile or portable and that perform wireless communications. Examples of UE devices include mobile telephones or smart phones (e.g., iPhone™, Android™-based phones), portable gaming devices (e.g., Nintendo Switch™ Nintendo DS™, PlayStation Vita™, PlayStation Portable™, Gameboy Advance™, iPhone™) laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, and the like. In general, the terms "UE" or "UE device" or "terminal" or "user device" may be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device may be portable (or mobile) or may be stationary or fixed at a certain location. A UE is an example of a wireless device.

Communication Device—any of various types of computer systems or devices that perform communications, where the communications may be wired or wireless. A communication device may be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," and the like, may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," and the like, are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an Application Specific Integrated Circuit (ASIC), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, and the like). For example, LTE may support scalable channel bandwidths from 1.4 MHz to 20 MHz. WLAN channels may be 22 MHz wide while Bluetooth channels may be 1 Mhz wide. Other protocols and standards may include different definitions of channels. Furthermore, some standards may define and use multiple types of channels (e.g., different channels for uplink or downlink and/or different channels for different uses such as data, control information, and the like).

Band—The term "band" has the full breadth of its ordinary meaning, and at least includes a section of spectrum (e.g., radio frequency spectrum) in which channels are used or set aside for the same purpose.

Configured to—Various components may be described as "configured to" perform a task or tasks. In such contexts, "configured to" is a broad recitation generally meaning "having structure that" performs the task or tasks during operation. As such, the component may be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component may be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is a non-limiting example of a possible system, and that features of this disclosure may be implemented in any of various systems, as desired.

As shown, the example wireless communication system includes a base station 102A, which communicates over a transmission medium with one or more user devices 106A and 106B, through 106Z. Each of the user devices may be referred to herein as a "user equipment" (UE). Thus, the user devices 106 are referred to as UEs or UE devices.

The base station (BS) 102A may be a base transceiver station (BTS) or cell site (e.g., a "cellular base station") and may include hardware that enables wireless communication with the UEs 106A through 106Z.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-A, 5G NR, HSPA, 3GPP2 CDMA2000. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE may utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using an SL interface for direct communications between devices. The IoT UEs may also execute background applications (e.g., keep-alive messages, status updates, and the like) to facilitate the connections of the IoT network.

As shown, the UEs 106, such as UE 106A and UE 106B, may directly exchange communication data via an SL interface 108. The SL interface 108 may be a PC5 interface comprising one or more physical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weather enclosure suitable for outdoor installation, and it may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B through 102N) operating according to the same or a different cellular communication standard may thus be provided as a network of cells, which may provide continuous or nearly continuous overlapping service to UEs 106A-106Z and similar devices over a geographic area via one or more cellular communication standards.

Thus, while base station 102A may act as a "serving cell" for UEs 106A-106Z as illustrated in FIG. 1, each UE 106 may also be capable of receiving signals from (and possibly within communication range of) one or more other cells (which may be provided by base stations 102B-102Z and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A and 102B illustrated in FIG. 1 may be macro cells, while base station 102Z may be a micro cell. Other configurations are also possible.

In some aspects, base station 102A may be a next generation base station, (e.g., a 5G New Radio (5G NR) base station, or "gNB"). In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, and the like) in addition to at least one of the cellular communication protocol discussed in the definitions above. The UE 106 may also or alternatively be configured to communicate using one or more global navigational satellite systems (GNSS) (e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

In one or more embodiments, the UE 106 may be a device with cellular communication capability such as a mobile phone, a hand-held device, a computer, a laptop, a tablet, a smart watch, or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for a multiple-input multiple output (MIMO) configuration) for performing wireless communications. In general, a radio may include any combination of a baseband processor, analog RF signal processing circuitry (e.g., including filters, mixers, oscillators, amplifiers, and the like), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid may be used for downlink transmissions from any of the base stations 102 to the UEs 106, while uplink transmissions may utilize similar techniques. The grid may be a time-frequency grid, called a resource grid or time-frequency resource grid, which is the physical resource in the downlink in each slot. Such a time-frequency plane representation is a common practice for Orthogonal Frequency Division Multiplexing (OFDM) systems, which makes it intuitive for radio resource selection. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher layer signaling to the UEs 106. The physical downlink control channel (PDCCH) may carry information about the transport format and resource allocations related to the PDSCH channel, among other things. It may also inform the UEs 106 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the Downlink Control Information (DCI) and the channel condition. There may be four or more different PDCCH formats defined in LTE with different numbers of CCEs (e.g., aggregation level, L=1, 2, 4, or 8).

Example Communication Device

Figure 2:
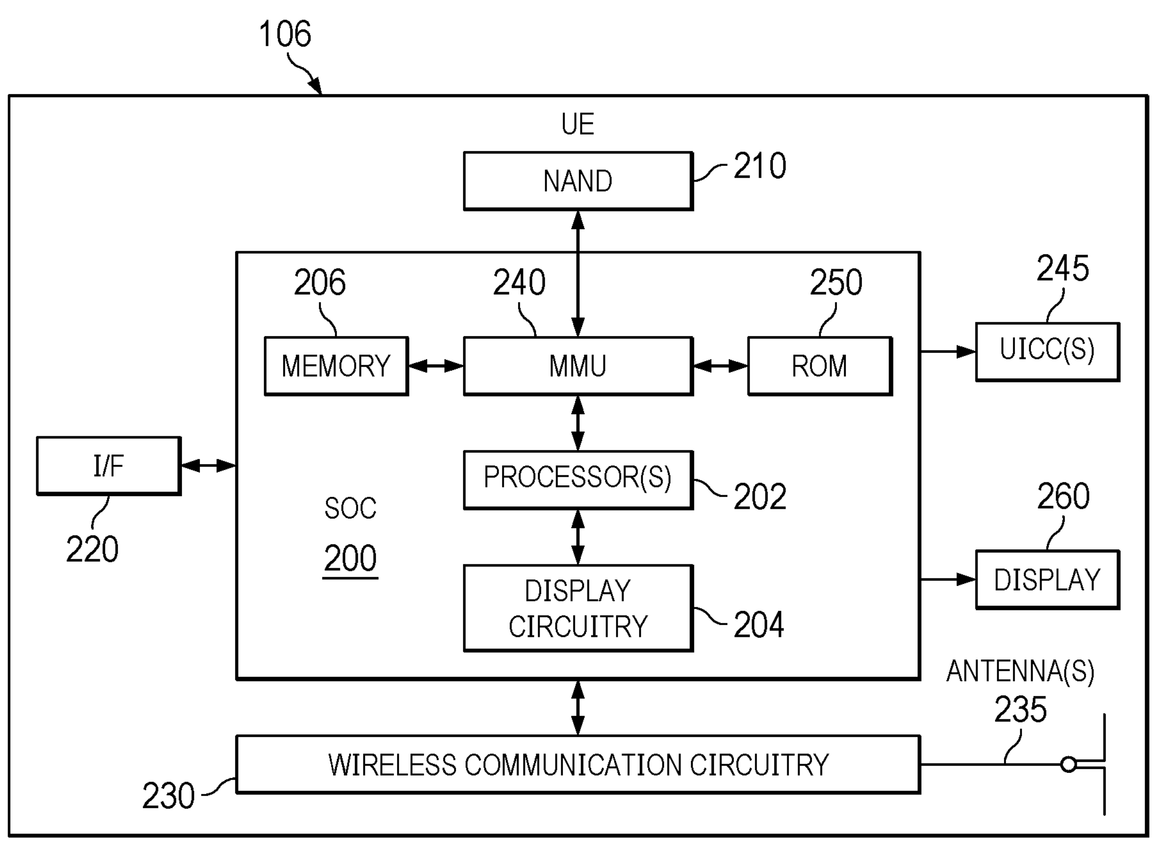
FIG. 2 illustrates an example block diagram of a UE, according to some aspects.

FIG. 2 illustrates an example simplified block diagram of a communication device 106, according to some aspects. It is noted that the block diagram of the communication device of FIG. 2 is only one example of a possible communication device. According to aspects, communication device 106 may be a UE device or terminal, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 200 configured to perform core functions. For example, this set of components may be implemented as a system on chip (SOC), which may include portions for various purposes. Alternatively, this set of components 200 may be implemented as separate components or groups of components for the various purposes. The set of components 200 may be coupled (e.g., communicatively; directly or indirectly) to various other circuits of the communication device 106.

For example, the communication device 106 may include various types of memory (e.g., including NAND flash 210), an input/output interface such as connector I/F 220 (e.g., for connecting to a computer system; dock; charging station; input devices, such as a microphone, camera, keyboard; output devices, such as speakers; and the like), the display 260, which may be integrated with or external to the communication device 106, and wireless communication circuitry 230 (e.g., for LTE, LTE-A, NR, UMTS, GSM, CDMA2000, Bluetooth, Wi-Fi, NFC, GPS, and the like). In some aspects, communication device 106 may include wired communication circuitry (not shown), such as a network interface card (e.g., for Ethernet connection).

The wireless communication circuitry 230 may couple (e.g., communicatively; directly or indirectly) to one or more antennas, such as antenna(s) 235 as shown. The wireless communication circuitry 230 may include cellular communication circuitry and/or short to medium range wireless communication circuitry, and may include multiple receive chains and/or multiple transmit chains for receiving and/or transmitting multiple spatial streams, such as in a MIMO configuration.

In some aspects, as further described below, cellular communication circuitry 230 may include one or more receive chains (including and/or coupled to (e.g., communicatively; directly or indirectly) dedicated processors and/or radios) for multiple Radio Access Technologies (RATs) (e.g., a first receive chain for LTE and a second receive chain for 5G NR). In addition, in some aspects, cellular communication circuitry 230 may include a single transmit chain that may be switched between radios dedicated to specific RATs. For example, a first radio may be dedicated to a first RAT (e.g., LTE) and may be in communication with a dedicated receive chain and a transmit chain shared with a second radio. The second radio may be dedicated to a second RAT (e.g., 5G NR) and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements.

The communication device 106 may further include one or more smart cards 245 that include Subscriber Identity Module (SIM) functionality, such as one or more Universal Integrated Circuit Card(s) (UICC(s)) cards 245.

As shown, the SOC 200 may include processor(s) 202, which may execute program instructions for the communication device 106 and display circuitry 204, which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, wireless communication circuitry 230, connector I/F 220, and/or display 260. The MMU 240 may be configured to perform memory protection and page table translation or set up. In some aspects, the MMU 240 may be included as a portion of the processor(s) 202.

As noted above, the communication device 106 may be configured to communicate using wireless and/or wired communication circuitry. As described herein, the communication device 106 may include hardware and software components for implementing any of the various features and techniques described herein. The processor 202 of the communication device 106 may be configured to implement part or all of the features described herein (e.g., by executing program instructions stored on a memory medium). Alternatively (or in addition), processor 202 may be configured as a programmable hardware element, such as a Field Programmable Gate Array (FPGA), or as an Application Specific Integrated Circuit (ASIC). Alternatively (or in addition) the processor 202 of the communication device 106, in conjunction with one or more of the other components 200, 204, 206, 210, 220, 230, 240, 245, 250, 260 may be configured to implement part or all of the features described herein.

In addition, as described herein, processor 202 may include one or more processing elements. Thus, processor 202 may include one or more integrated circuits (ICs) that are configured to perform the functions of processor 202. In addition, each integrated circuit may include circuitry (e.g., first circuitry, second circuitry, and the like) configured to perform the functions of processor(s) 202.

Further, as described herein, wireless communication circuitry 230 may include one or more processing elements. In other words, one or more processing elements may be included in wireless communication circuitry 230. Thus, wireless communication circuitry 230 may include one or more integrated circuits (ICs) that are configured to perform the functions of wireless communication circuitry 230. In addition, each integrated circuit may include circuitry (e.g., first circuitry, second circuitry, and the like) configured to perform the functions of wireless communication circuitry 230.

Example Base Station

Figure 3:
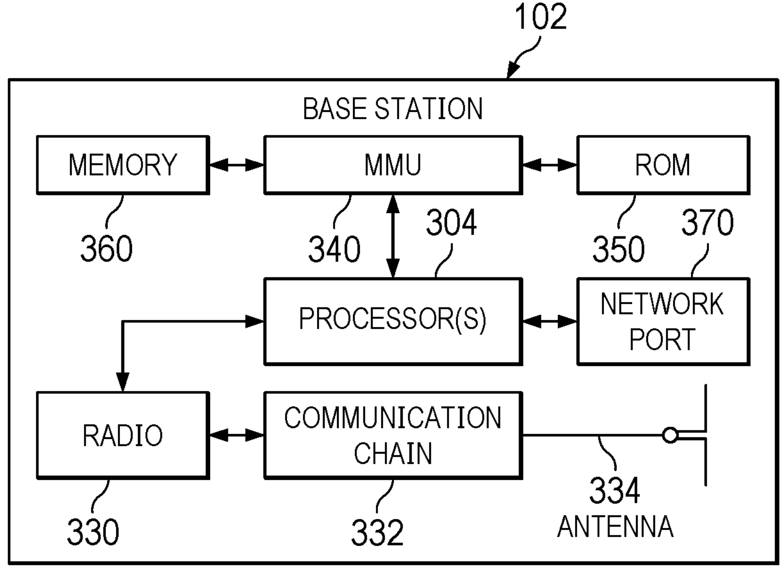
FIG. 3 illustrates an example block diagram of a Base Station (BS), according to some aspects.

FIG. 3 illustrates an example block diagram of a base station 102, according to some aspects. It is noted that the base station of FIG. 3 is a non-limiting example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some aspects, base station 102 may be a next generation base station, (e.g., a 5G New Radio (5G NR) base station, or "gNB"). In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including 5G NR, LTE, LTE-A, GSM, UMTS, CDMA2000, Wi-Fi, and the like.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, and the like).

Further, the BS 102 may include hardware and software components for implementing or supporting implementation of features described herein. The processor 304 of the base station 102 may be configured to implement or support implementation of part or all of the methods described herein (e.g., by executing program instructions stored on a memory medium). Alternatively, the processor 304 may be configured as a programmable hardware element, such as a Field Programmable Gate Array (FPGA), or as an Application Specific Integrated Circuit (ASIC), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may include one or more processing elements. Thus, processor(s) 304 may include one or more integrated circuits (ICs) that are configured to perform the functions of processor(s) 304. In addition, each integrated circuit may include circuitry (e.g., first circuitry, second circuitry, and the like) configured to perform the functions of processor(s) 304.

Further, as described herein, radio 330 may include one or more processing elements. Thus, radio 330 may include one or more integrated circuits (ICs) that are configured to perform the functions of radio 330. In addition, each integrated circuit may include circuitry (e.g., first circuitry, second circuitry, and the like) configured to perform the functions of radio 330.

Example Cellular Communication Circuitry

Figure 4:
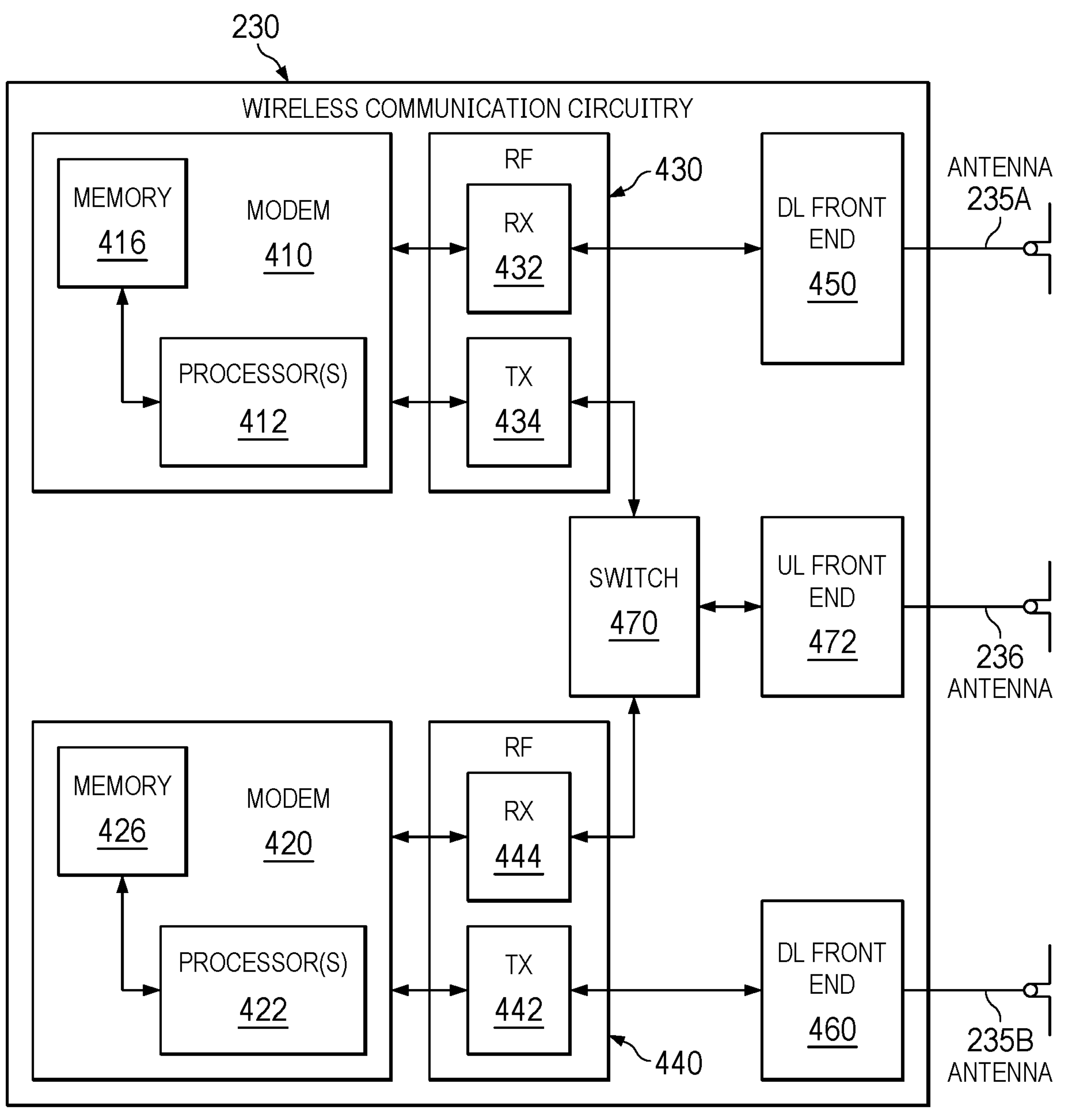
FIG. 4 illustrates an example block diagram of wireless communication circuitry, according to some aspects.

FIG. 4 illustrates an example simplified block diagram of cellular communication circuitry, according to some aspects. It is noted that the block diagram of the cellular communication circuitry of FIG. 4 is only one example of a possible cellular communication circuit; other circuits, such as circuits including or coupled to sufficient antennas for different RATs to perform uplink activities using separate antennas, or circuits including or coupled to fewer antennas (e.g., that may be shared among multiple RATs) are also possible. According to some aspects, cellular communication circuitry 230 may be included in a communication device, such as communication device 106 described above. As noted above, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 230 may couple (e.g., communicatively; directly or indirectly) to one or more antennas, such as antennas 235*a*, 235*b*, and 236 as shown. In some aspects, cellular communication circuitry 230 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 4, cellular communication circuitry 230 may include a first modem 410 and a second modem 420. The first modem 410 may be configured for communications according to a first RAT, e.g., such as LTE or LTE-A, and the second modem 420 may be configured for communications according to a second RAT, e.g., such as 5G NR.

As shown, the first modem 410 may include one or more processors 412 and a memory 416 in communication with processors 412. Modem 410 may be in communication with a radio frequency (RF) front end 430. RF front end 430 may include circuitry for transmitting and receiving radio signals. For example, RF front end 430 may include receive circuitry (RX) 432 and transmit circuitry (TX) 434. In some aspects, receive circuitry 432 may be in communication with downlink (DL) front end 450, which may include circuitry for receiving radio signals via antenna 235*a*.

Similarly, the second modem 420 may include one or more processors 422 and a memory 426 in communication with processors 422. Modem 420 may be in communication with an RF front end 440. RF front end 440 may include circuitry for transmitting and receiving radio signals. For example, RF front end 440 may include receive circuitry 442 and transmit circuitry 444. In some aspects, receive circuitry 442 may be in communication with DL front end 460, which may include circuitry for receiving radio signals via antenna 235*b*.

In some aspects, a switch 470 may couple transmit circuitry 434 to uplink (UL) front end 472. In addition, switch 470 may couple transmit circuitry 444 to UL front end 472. UL front end 472 may include circuitry for transmitting radio signals via antenna 236. Thus, when cellular communication circuitry 230 receives instructions to transmit according to the first RAT (e.g., as supported via the first modem 410), switch 470 may be switched to a first state that allows the first modem 410 to transmit signals according to the first RAT (e.g., via a transmit chain that includes transmit circuitry 434 and UL front end 472). Similarly, when cellular communication circuitry 230 receives instructions to transmit according to the second RAT (e.g., as supported via the second modem 420), switch 470 may be switched to a second state that allows the second modem 420 to transmit signals according to the second RAT (e.g., via a transmit chain that includes transmit circuitry 444 and UL front end 472).

As described herein, the first modem 410 and/or the second modem 420 may include hardware and software components for implementing any of the various features and techniques described herein. The processors 412, 422 may be configured to implement part or all of the features described herein, e.g., by executing program instructions stored on a memory medium (e.g., a non-transitory computer-readable memory medium). Alternatively (or in addition), processors 412, 422 may be configured as a programmable hardware element, such as an FPGA (Field Programmable Gate Array), or as an ASIC (Application Specific Integrated Circuit). Alternatively (or in addition) the processors 412, 422, in conjunction with one or more of the other components 430, 432, 434, 440, 442, 444, 450, 470, 472, 235 and 236 may be configured to implement part or all of the features described herein.

In addition, as described herein, processors 412, 422 may include one or more processing elements. Thus, processors 412, 422 may include one or more integrated circuits (ICs) that are configured to perform the functions of processors 412, 422. In addition, each integrated circuit may include circuitry (e.g., first circuitry, second circuitry, and the like) configured to perform the functions of processors 412, 422.

In some aspects, the cellular communication circuitry 230 may include only one transmit/receive chain. For example, the cellular communication circuitry 230 may not include the modem 420, the RF front end 440, the DL front end 460, and/or the antenna 235*b*. As another example, the cellular communication circuitry 230 may not include the modem 410, the RF front end 430, the DL front end 450, and/or the antenna 235*a*. In some aspects, the cellular communication circuitry 230 may also not include the switch 470, and the RF front end 430 or the RF front end 440 may be in communication, e.g., directly, with the UL front end 472.

Issues in Voice Over New Radio (VoNR) Call Setup Failures and Drops

There are various network and UE terminal conditions that the inventors have observed as resulting in VoNR call setup failure and/or call drops, and for which a more optimal set of network and/or UE terminal behaviors would be beneficial.

In one such scenario, after UE registration is complete in SA, the PDU Sessions need to be established. If the IMS PDU session is successful, but the Internet PDU session is still pending, and the T3580 timer is still running, the UE may be able to initiate a VoNR call and become connected successfully. However, the UE might not be able to perform Multi-Radio Access Bearer (i.e., Multi-RAB or MRAB) functionality, i.e., because the Internet PDU session is not yet set up. Thus, on expiry of the T3580 timer, the UE will end up falling back to the legacy RAT (e.g., LTE), which might result in an undesirable call drop.

In another such scenario, after UE registration is complete in SA, if the IMS PDU session is successful, but the Internet PDU session is still pending and the T3580 timer is still running, the UE may be able to initiate a VoNR call and become connected successfully. However, if the UE receives a PDU session reject message for the Internet DNN, then, based on current UE handling mechanisms, this might also result in an undesirable call drop.

In yet another such scenario, after UE registration is complete in SA for a VoNR-capable UE, and the PDU sessions are successfully set up, if the IMS PDU session uses Single Network Slice Selection Assistance Information (S-NSSAI) with an ID of (2) and the Internet PDU session uses S-NSSAI with an ID of (1), the network may configure the Network Slice Simultaneous Registration Group (NSSRG) in such a way that S-NSSAI (1) and S-NSSAI (2) cannot work together simultaneously, which might also result in call setup failure scenarios.

Figure 5:
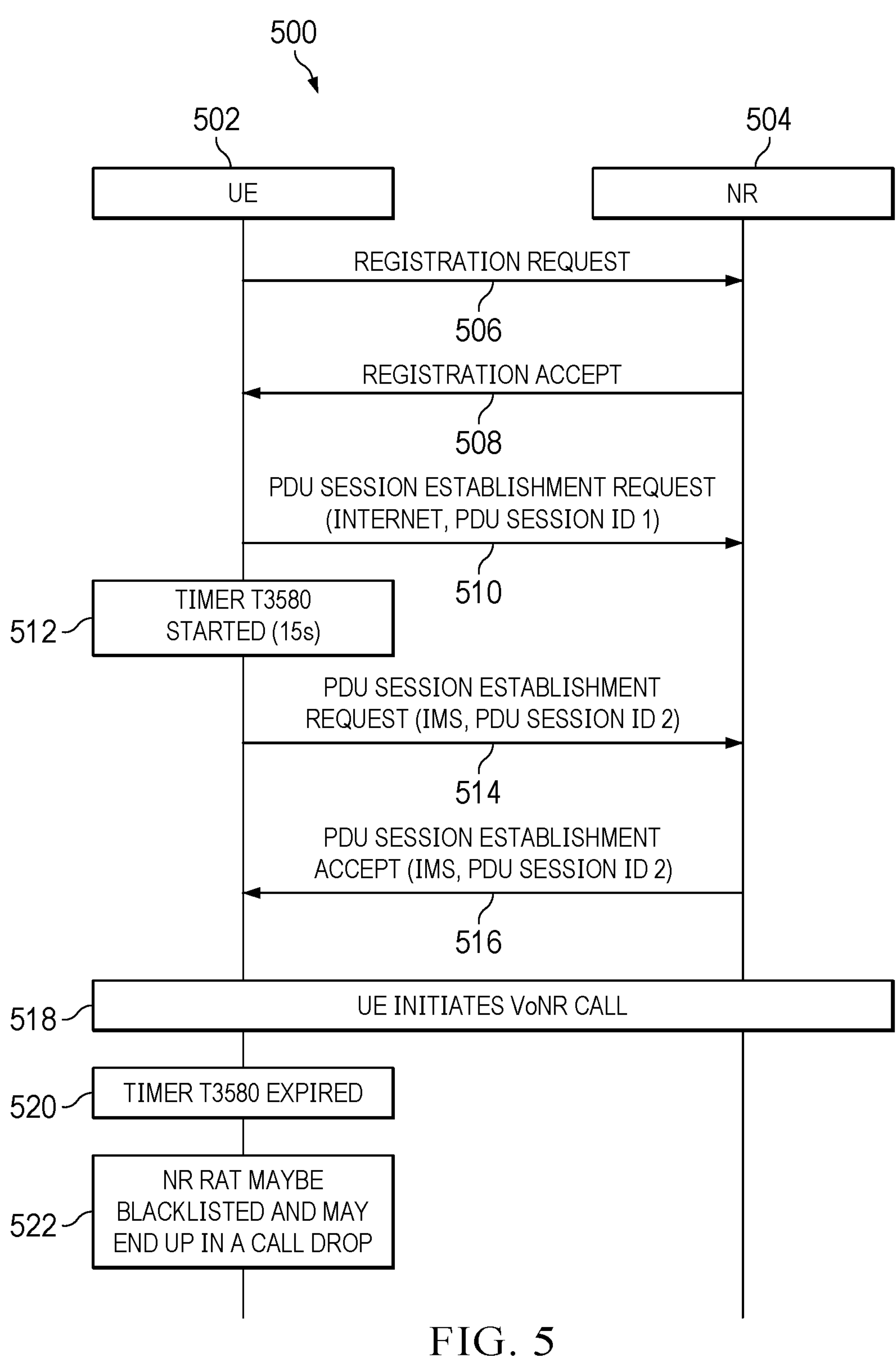
FIG. 5 illustrates a flow diagram detailing a prior art method of handling voice call fallback for a UE camped to 5G SA when an Internet PDU session cannot be established, according to some aspects.

Turning now to FIG. 5, a flow diagram 500 detailing a prior art method of handling voice call fallback for a UE camped to 5G SA when an Internet PDU session cannot be established is shown, according to some aspects. First, a UE 502 may make a registration request (506) to a NR network 504. Then, a registration accept message 508 may be sent from NR network 504 to UE 502. Next, a PDU Session Establishment Request (510) for an Internet PDU Session (e.g., with an ID=1) may be sent to NR network 504. At that time, at block 512, the UE 502 may start a T3580 timer (e.g., set with a 15 second expiry limit). Next, a PDU Session Establishment Request (514) for an IMS PDU Session (e.g., with an ID=2) may be sent to NR network 504. In this example, a PDU Session Establishment Accept message 516 may be received for the IMS PDU session. At that point, if, at block 518, the UE initiates a VoNR call and then, at block 520, the aforementioned T3580 timer expires, then, at block 522, the NR RAT may actually be blacklisted by the UE, and it may result in the call being dropped. As may now be appreciated, these are undesirable network behaviors that some of the various solutions presented herein will attempt to improve upon.

Issues in Evolved Packet System Fallback (EPSFB) Call Setup Failures and Drops

According to still other examples, there are various network and UE terminal conditions that the inventors have observed as resulting in EPSFB call setup failure and/or call drops, and for which a more optimal set of network and/or UE terminal behaviors would be beneficial.

In one such scenario, if an EPSFB-capable UE is registered successfully in SA, and the PDU Sessions are setup but, during EPSFB, only the EBI 6 for IMS is successfully setup (i.e., the Internet EBI was not received in TAU Accept message), then the UE will perform detach request (with cause=40) and eventually go out of service (OOS) in the LTE RAT (i.e., the UE will blacklist the RAT). This will also result in an undesirable call setup failure.

In another such scenario, if an EPSFB-capable UE is registered successfully in SA, and the PDU Sessions are setup but, during EPSFB, only the EBI 5 for Internet is successfully setup (i.e., the IMS EBI was not received in TAU Accept message), then the UE will try to setup an IMS bearer by initiating a PDN Connectivity Request. In some cases, the network will not setup a dedicated bearer, which may also result in an undesirable call setup failure condition (e.g., due to a pre-condition timeout).

Figure 6:
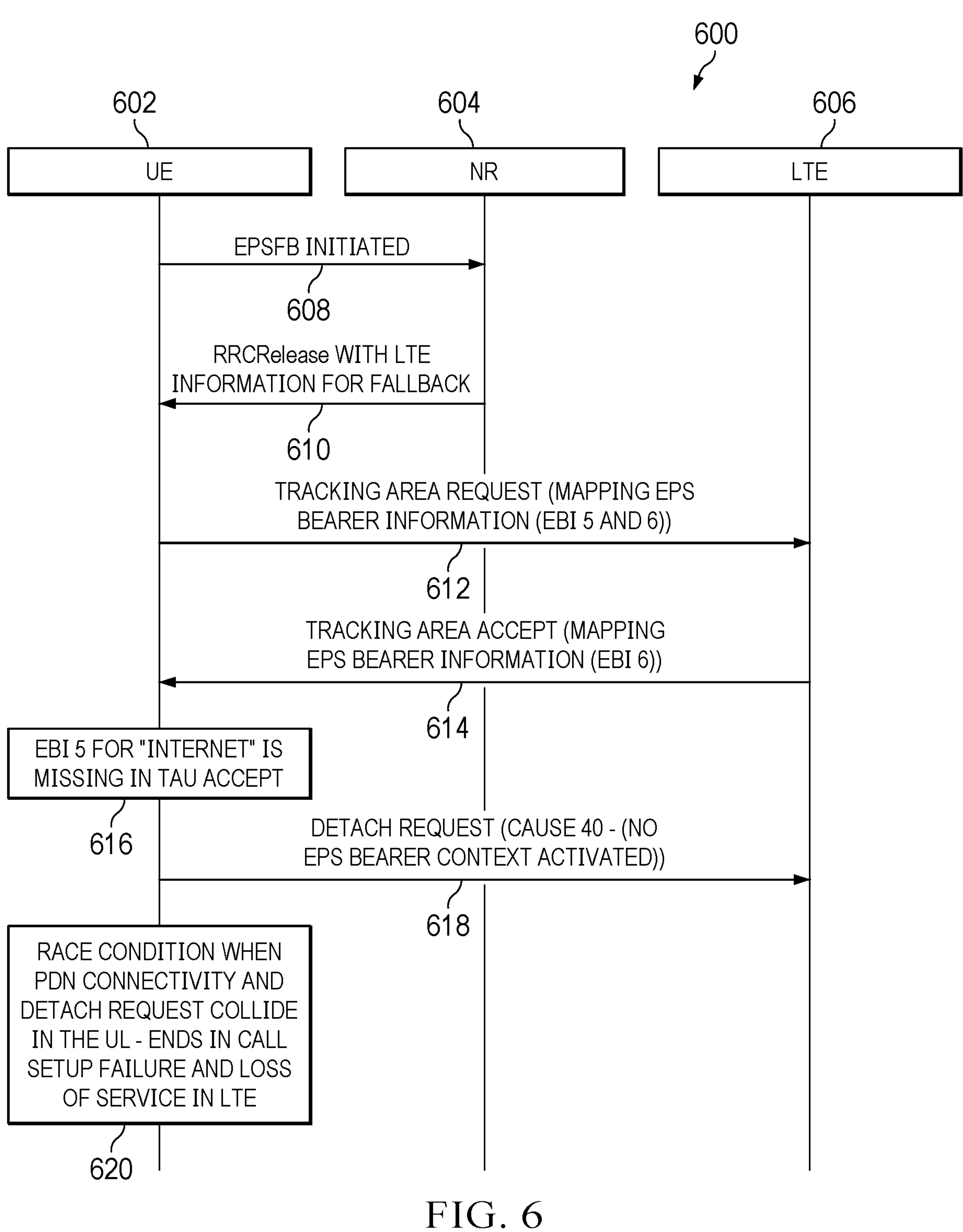
FIG. 6 illustrates a flow diagram detailing a prior art method of handling EPSFB for a UE camped to 5G SA when an Internet EBI is not received, according to some aspects.

Turning now to FIG. 6, a flow diagram 600 detailing a prior art method of handling EPSFB for a UE camped to 5G SA when an Internet EBI is not received is shown, according to some aspects. First, a UE 602 may, at 608, initiate an EPSFB procedure with an NR network 604. In response, at 610, the NR network 604 may send an RRC-Release message with LTE info for fallback in it to the UE 602. Next, UE 602 may send a Tracking Area Update (TAU) Request 612 to an LTE network 606 (e.g., with mapping EPS bearer info in EBI 5 and 6). Next, at 614, the LTE network 606 may response with a TAU Accept message (e.g., with mapping EPS bearer info in EBI 6).

Then, at block 616, UE 602 may realize the EBI 5 with information for the Internet EBI is missing from the TAU Accept message. As such, at 618, the UE 602 may be caused to send a detach request to the LTE network 606 (e.g., with a cause=40, indicating that no EPS bearer context is activated). This may then cause the UE 602, at block 620, to enter into a race condition, wherein the PDN Connectivity message and the detach request collide in the Uplink, which may result in a call setup failure and eventual loss of service in the LTE network. As may now be appreciated, these are undesirable network behaviors that some of the various solutions presented herein will attempt to improve upon.

Figure 7A:
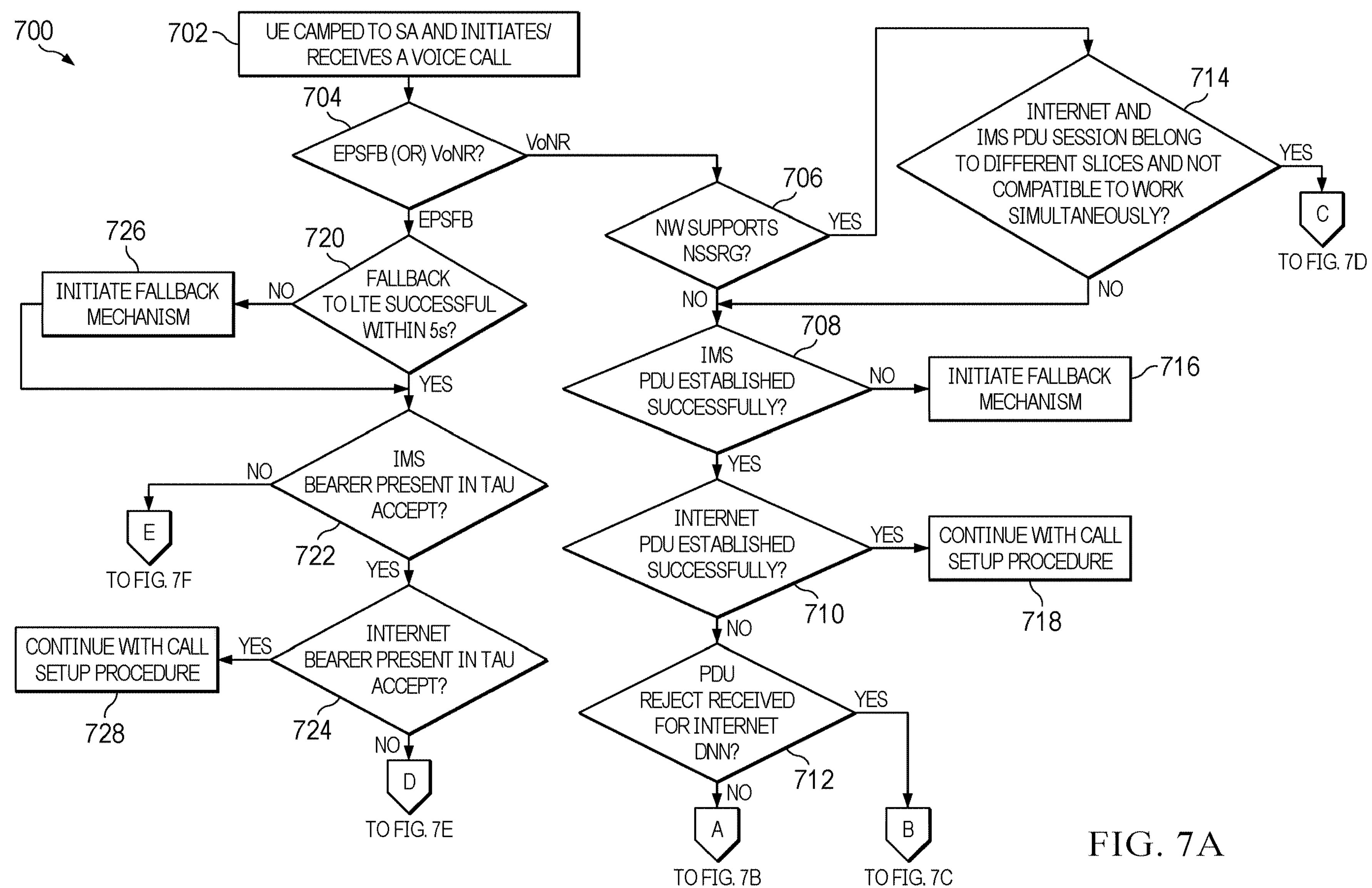
FIG. 7A illustrates a flow diagram detailing various methods of optimizing simultaneous voice and data experiences in cellular networks across a broad range of scenarios, according to some aspects.

Optimizing Simultaneous Voice and Data Experiences in Cellular Networks Across a Broad Range of Scenarios Turning now to FIG. 7A, a flow diagram 700 detailing various methods of optimizing simultaneous voice and data experiences in cellular networks across a broad range of scenarios is shown, according to some aspects. First, at block 702, a UE may be camped to 5G SA and may attempt to initiate or receive a voice call. Then, at block 704, if the call may be completed over VoNR (i.e., option "VoNR" at block 704), the method may proceed to block 706 to determine if the network supports Network Slice Simultaneous Registration Group (NSSRG). If the network does not support NSSRG (i.e., "NO" at block 706), the method may proceed to block 708 to determine if the IMS PDU session was established successfully. If the IMS PDU session was established successfully (i.e., "YES" at block 708), the method may proceed to block 710 to determine if the Internet PDU session was established successfully. (If, instead, the IMS PDU session was not established successfully, i.e., "NO" at block 708, the method may proceed to block 716 to initiate its preferred fallback mechanism.)

If the Internet PDU session was not established successfully (i.e., "NO" at block 710), the method may proceed to block 712, wherein the method may determine whether a PDU session rejection message was received for an Internet DNN. If a PDU session rejection message was not received for an Internet DNN (i.e., "NO" at block 712), the method may proceed to the flow diagram of FIG. 7B, which is described in further detail below. If a PDU session rejection message was received for an Internet DNN (i.e., "YES" at block 712), the method may proceed to the flow diagram of FIG. 7C, which is described in further detail below. (If, instead, the Internet PDU session was established successfully, i.e., "YES" at block 710, the method may proceed to block 718, wherein the method may continue with a normal call setup procedure.)

Returning now to block 706, if the network does support NSSRG (i.e., "YES" at block 706), the method may proceed to block 714 to determine whether the Internet and IMS PDU sessions belong to different slices and are not compatible to work together simultaneously. If so, (i.e., "YES" at block 714), the method may proceed to the flow diagram of FIG. 7D, which is described in further detail below. If either the network does not support NSSRG (i.e., "NO" at block 706) or the Internet and IMS PDU sessions either belong to the same network slice or are compatible to work together simultaneously (i.e., "NO" at block 714), the method may proceed to the procedure described above beginning with execution at block 708.

Returning now to block 704, if the call may be completed over EPSFB (i.e., option "EPSFB" at block 704), the method may proceed to block 720 to determine if the EPSFB procedure to LTE was successful within a predetermined amount of time, e.g., 5 seconds. If the LTE fallback was successful within the predetermined amount of time (i.e., "YES" at block 720), the method may proceed to block 722 to determine whether an IMS bearer was present in a received TAU ACCEPT message. If the IMS bearer was not present (i.e., "NO" at block 722), the method may proceed to the flow diagram of FIG. 7F, which is described in further detail below. If, instead, the IMS bearer was present in the received TAU ACCEPT message (i.e., "YES" at block 722), the method may proceed to block 724 to determine if the Internet bearer was also present in the received TAU ACCEPT message. If the Internet bearer was not present (i.e., "NO" at block 724), the method may proceed to the flow diagram of FIG. 7E, which is described in further detail below. If, instead, the Internet bearer was present in the received TAU ACCEPT message (i.e., "YES" at block 724), the method may proceed to block 728 to continue with a normal call setup procedure.

Returning to block 720, if the LTE fallback was not successful within the predetermined amount of time (i.e., "NO" at block 720), the method may proceed to block 726 to initiate its preferred fallback mechanism (e.g., to a 2G/3G network via a CSFB mechanism).

Turning now to FIG. 7B, a flow diagram 740 providing additional details for a method of handling voice call fallback on VoNR when an IMS PDU session is established but an Internet PDU session is not established is shown, according to some aspects. In particular, after expiry of a first timer, if any of the following conditions are met: (a) the proximity sensor is activated and the display screen is inactive; (b) the display screen is locked; (c) the display screen is unlocked and the terminal is not utilizing any applications that require packet-switched (PS) data; or (d) the voice call is from or to a designated favorite contact of a user of the terminal, then the UE may proceed to re-send a PDU session request for the Internet DNN; and proceed with the voice call using the VoNR protocol. Otherwise, the UE may fall back to complete the voice call over an LTE network using a VoLTE protocol. Note that, if the Internet PDU session is setup before expiry of first timer, then the UE may simply proceed with the voice call using the VoNR protocol directly.

Turning now to FIG. 7C, a flow diagram 750 providing additional details for a method of handling voice call fallback on VoNR when an IMS PDU session is established but an Internet PDU session is not established is shown, according to some aspects. In particular, if a PDU session establishment reject message is received with a 5GSM cause code of 26, 36, or 39, then a UE may proceed to: check the value of back-off timer in PDU Reject message and, if the back-off timer is higher than a first timer value, "T", then the UE may re-send a PDU session establishment request for the Internet DNN after expiry of the first timer and proceed with the voice call using the VoNR protocol.

Otherwise, i.e., if the back-off timer value is not higher than T, the UE does not need to wait until back-off timer expires, and it may instead immediately fall back to complete the voice call over an LTE network using a VoLTE protocol, i.e., regardless of the back-off timer value. In the case of all other rejection message 5GSM cause codes, the UE may simply fall back to complete the voice call over an LTE network using a VoLTE protocol immediately, i.e., regardless of the back-off timer value. Note that the first timer value, T, is a UE-side configurable value. In preferred embodiments, the value of T is less than the value of the T3580 timer.

Turning now to FIG. 7D, a flow diagram 760 providing additional details for a method of handling voice call fallback on VoNR when an IMS PDU session and an Internet PDU session are established in different network slices but are not compatible to work simultaneously is shown, according to some aspects. In this example, if any of the following conditions are met: (a) the proximity sensor is activated and the display screen is inactive; (b) the display screen is locked; (c) the display screen is unlocked and the terminal is not utilizing any applications that require PS data; or (d) the voice call is from or to a designated favorite contact of a user of the terminal, then the UE may release the Internet PDU session; complete set up of the IMS PDU session; and proceed with the voice call using the VoNR protocol. Otherwise, the UE may fall back to complete the voice call over an LTE network using a VoLTE protocol. According to some such embodiments, if the user initiates packet switched (PS) data during the VoNR call, then the UE can initiate a Fallback Mechanism to support MRAB (i.e., simultaneous data and voice services).

Turning now to FIG. 7E, a flow diagram 770 providing additional details for a method of handling voice call fallback on an LTE network after an EPSFB procedure has occurred and an IMS bearer is present—but an Internet bearer—is not present is shown, according to some aspects. In particular, a UE may initiate a PDN Connectivity Request immediately for an Internet bearer. Then, if a VoLTE call is being made from or to a designated favorite contact of a user, the UE may avoid performing a detach request procedure altogether. Otherwise, the UE may simply delay performing the detach request procedure until expiry of a first timer (e.g., T3842).

If the Internet bearer is setup before expiry of the first timer (e.g., T3842), then the UE may proceed with the voice call using a VoLTE protocol. Otherwise, the UE may proceed to fall back to complete the voice call over a 2G/3G network using a Circuit Switched Fallback (CSFB) protocol.

Turning now to FIG. 7F, a flow diagram 780 providing additional details for a method of handling voice call fallback on an LTE network after an EPSFB procedure has occurred and an IMS bearer is not present is shown, according to some aspects. For a mobile originated (MO) voice call, the UE may proceed to: initiate a PDN Connectivity Request to setup a an IMS bearer; and wait a configurable amount of time, "X," after the IMS bearer request is initiated to determine if a bearer procedure (e.g., a dedicated bearer procedure) is initiated by the LTE network. If the bearer is setup, then the UE may proceed with the voice call using a VoLTE protocol. Otherwise, the UE may fall back to complete the voice call over a 2G/3G network using a CSFB protocol.

Note that, according to some embodiments, the configurable amount of time, X, may depend on the current status of the link quality between the UE and the network. For example, in one non-limiting implementation: a good link quality may correspond to the use of a low value for X, such as 3 seconds; a poor link quality may correspond to increasing the value of X by 2 seconds, e.g., up to 5 seconds; and a very poor link quality may correspond to timing out the process of waiting on the network to initiate the bearer procedures after another 2 seconds, e.g., up to a total timeout of 7 seconds.

If, instead, the UE terminal is receiving the voice call, the UE may proceed directly to fall back to complete the voice call over a 2G/3G network using the CSFB protocol, as the UE would not know of the network's paging retry mechanism after setting up the IMS bearer.

User Experience Issues with Lack of Multi-RAB and Lack of NR Carrier Aggregation (CA) During VoNR In some scenarios, it has been observed that a UE may be registered successfully in SA mode, have its PDU Sessions setup successfully, and be VoNR-capable, but the network does not support simultaneous data and voice services in SA mode. In such scenarios, when the UE initiates a VoNR call, users might not be able to perform data services, which can lead to a poor user experience.

In still other scenarios, it has been observed that a UE may registered successfully in SA mode, have its PDU Sessions setup successfully, and be VoNR-capable, but the network does not support VoNR with New Radio Carrier Aggregation (NR-CA), but the network does support VoLTE with Long-Term Evolution Carrier Aggregation (LTE-CA). In such scenarios, when the UE initiates a VoNR call, users might users might face poor data issues if the NR bandwidth is inferior compared to the available LTE-CA bandwidth. This may also lead to a poor user experience.

Figure 8:
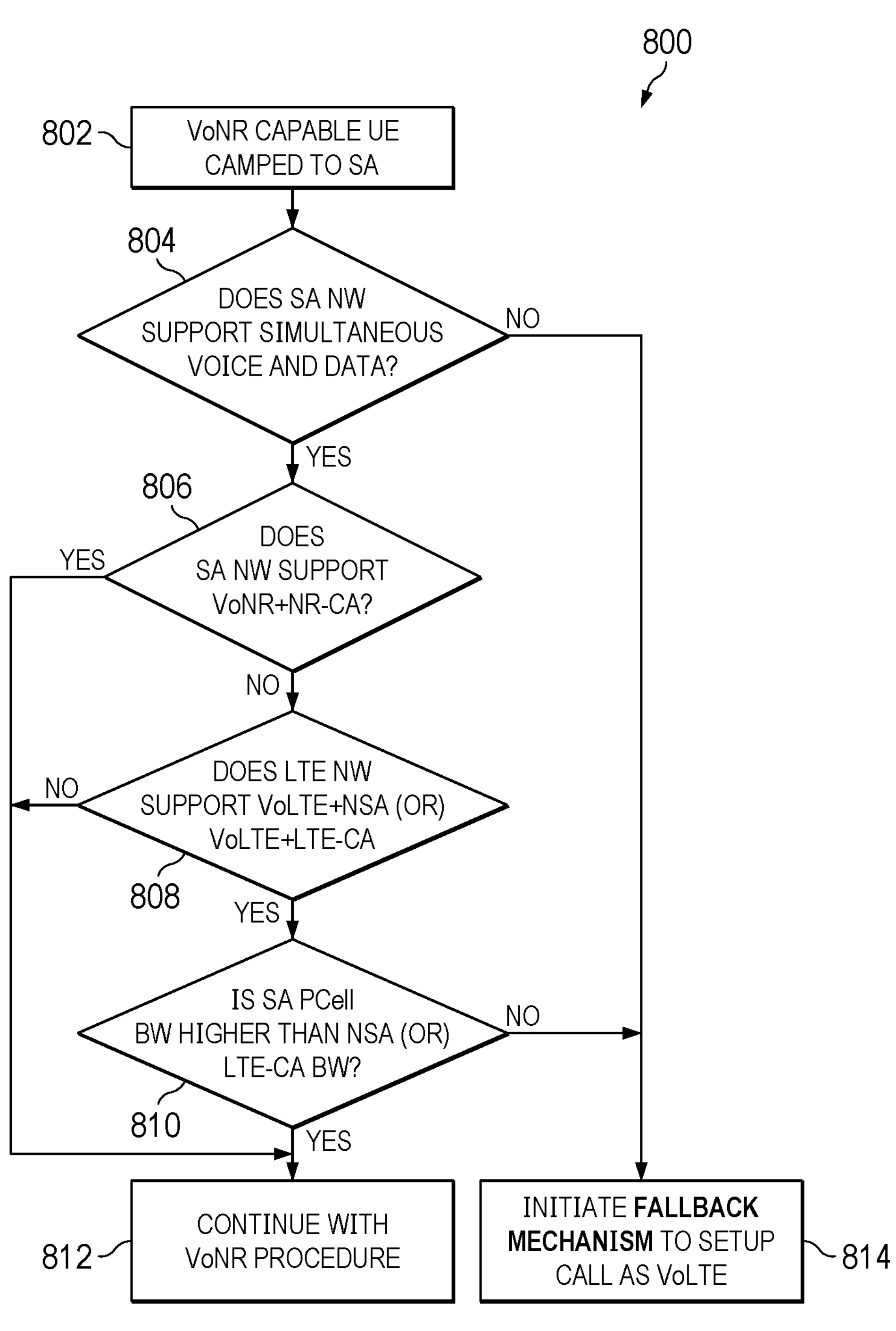
FIG. 8 illustrates a flow diagram detailing a method of handling voice call fallback on VoNR when a network does not support simultaneous voice and data services in SA, according to some aspects.

Turning now to FIG. 8, a flow diagram 800 detailing a method of handling voice call fallback on VoNR when a network does not support simultaneous voice and data services in SA (or has bandwidth issues compared to LTE-CA) is shown, according to some aspects. First, at block 802, a VoNR-capable UE may be camped to 5G SA and, if the 5G SA network does support simultaneous voice and data (i.e., "YES" at block 804), the method may proceed to block 806 to determine whether the SA network supports VoNR with NR-CA. If the SA network does support VoNR with NR-CA (i.e., "YES" at block 806), the method may proceed to block 812 to continue the call using VoNR procedures. If, instead, the SA network does not support VoNR with NR-CA (i.e., "NO" at block 806), the method may proceed to block 808 to determine whether the LTE network supports VoLTE with Non-Standalone (NSA) mode or VoLTE with LTE-CA. If the LTE network does not support VoLTE with NSA or VoLTE with LTE-CA (i.e., "NO" at block 808), the method may proceed to block 812 to continue the call using VoNR procedures. If instead, the LTE network does support VoLTE with NSA or VoLTE with LTE-CA (i.e., "YES" at block 808), the method may proceed to block 810 to make a final determination.

At block 810, if the SA PCell's bandwidth is higher than the NSA bandwidth or the LTE-CA bandwidth (i.e., "YES" at block 810), the method may proceed to block 812 to continue the call using VoNR procedures. If instead, the SA PCell's bandwidth is not higher than the NSA bandwidth or the LTE-CA bandwidth (i.e., "NO" at block 810), the method may proceed to block 814 to initiate its preferred fallback mechanism to set up the call as VoLTE.

Returning to block 804, if the 5G SA network does not support simultaneous voice and data (i.e., "NO" at block 804), the method may proceed directly to block 814 to initiate its preferred fallback mechanism to set up the call as VoLTE.

Roaming Optimizations for VoNR-Capable UEs Camped to SA

In some scenarios, it has been observed that a UE may be registered successfully in SA mode, have its PDU Sessions setup successfully, and be VoNR-capable, but the network may, e.g., based on a Service Level Agreement (SLA), throttle data rates for inbound roaming users, which can cause users face to data issues and lead to a poor user experience.

Figure 9:
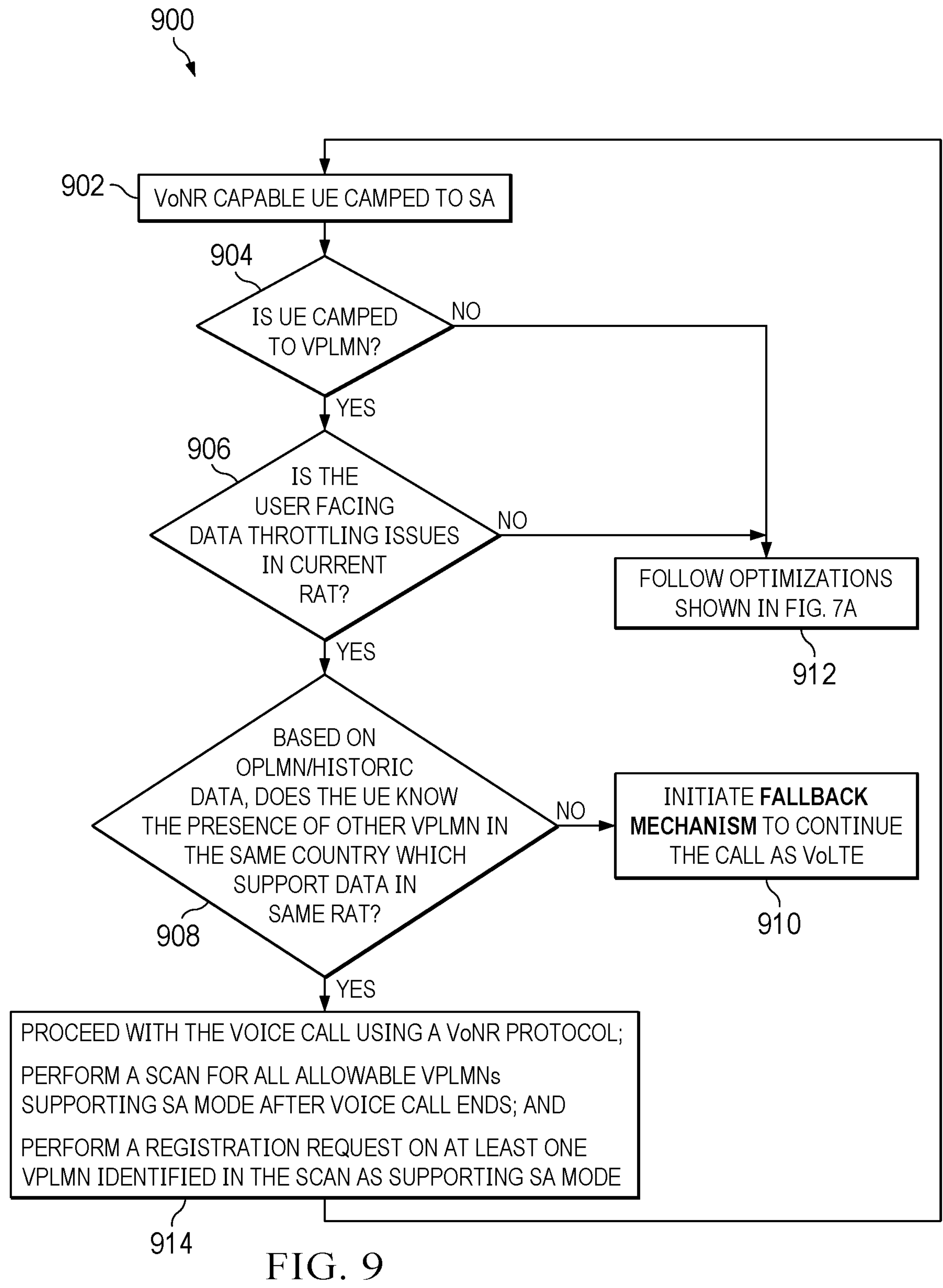
FIG. 9 illustrates a flow diagram detailing a method of handling voice call fallback when a VoNR-capable UE is camped to SA on a VPLMN, according to some aspects.

Turning now to FIG. 9, a flow diagram 900 detailing a method of handling voice call fallback when a VoNR-capable UE is camped to SA on a VPLMN is shown, according to some aspects. First, at block 902, a VoNR-capable UE may be camped to 5G SA and, if the UE is camped to a VPLMN (i.e., "YES" at block 904), the method may proceed to block 906 to determine if the user is facing data throttling issues in the current RAT. If the user is facing data throttling (i.e., "YES" at block 906), the method may proceed to block 908 to determine whether, e.g., based on Operator PLMN (OPLMN) and/or historic data, the UE knows of the presence of any other VPLMN in the same country that support data in the same RAT.

If the UE is aware of such VPLMN (i.e., "YES" at block 908), the method may proceed to block 914, wherein the UE may proceed with completing the voice call with a VoNR protocol, and then perform a scan for all allowable VPLMNs supporting SA mode after the voice call ends. Finally, the UE may perform a registration request on at least one VPLMN identified in the scan as supporting SA mode, before returning to block 902, where the UE is camped to SA and waiting for the next call to be initiated or received. If, instead, at block 908, the UE is not aware of any such VPLMN (i.e., "NO" at block 908), the method may proceed to block 910 and initiate its preferred fallback mechanism to continue the call as VoLTE.

Returning now to block 904, if the UE is not camped to a VPLMN (i.e., "NO" at block 904), or if, at block 906, the user is not facing data throttling issues in the current RAT (i.e., "NO" at block 906), the method may simply proceed to block 912, wherein the various optimizations described above with reference to FIGS. 7A-7F may be followed.

Mitigations to Save Voice Calls on Networks with Sub-Optimal Network Design

In some scenarios, it has been observed that a UE may be registered successfully in SA mode, have its PDU Sessions setup successfully, and be EPSFB-capable, but not support VoNR. Then, when an EPSFB call is initiated, the network may accidentally try to set up the call as VoNR by sending a PDU Session Modification Command. As mentioned above, in such scenarios, because the UE does not support VoNR, this is essentially a network configuration error. The UE may then process the NAS message and reply with a PDU Session Modification Complete message. However, due to the incorrect call setup, the SIP messages stop flowing and the 5G QoS Identifier (5QI) of 1 is not setup. Thus, a call setup failure will be observed, e.g., due to a pre-conditions timeout.

Figure 10A:
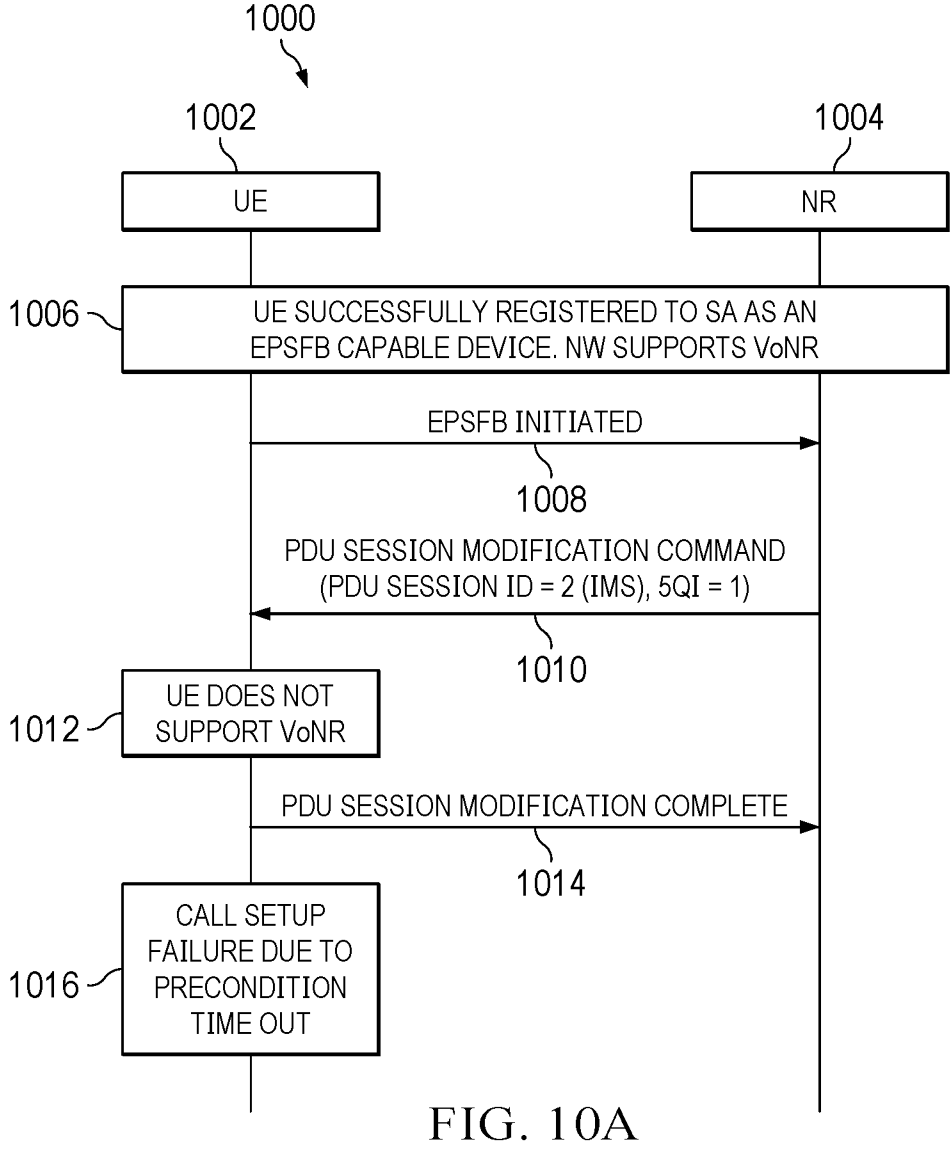
FIG. 10A illustrates a flow diagram detailing a prior art method of handling voice call setup failure when a non-VoNR-capable UE is camped to SA on a network that supports VoNR, according to some aspects.

Turning now to FIG. 10A, a flow diagram 1000 detailing a prior art method of handling voice call setup failure when a non-VoNR-capable UE is camped to SA on a network that supports VoNR is shown, according to some aspects. First, a UE 1002 may become successfully registered at block 1006 to a VoNR-supporting SA NR network 1004 as an EPSFB-capable device. As mentioned above, when an EPSFB procedure is initiated at 1008, the network may response at 1010 by sending a PDU Session Modification Command (e.g., with PDU Session ID=2 (i.e., IMS) and 5QI value of 1). However, as mentioned above, at block 1012, the UE does not support VoNR, so, at 1014, the UE may then process the NAS message and reply with a PDU Session Modification Complete message. However, due to the incorrect call setup, at block 1016, the call setup may fail, e.g., due to a pre-conditions timeout. This is an undesirable behavior and a result of poor network design, which would ideally be avoided.

Figure 10B:
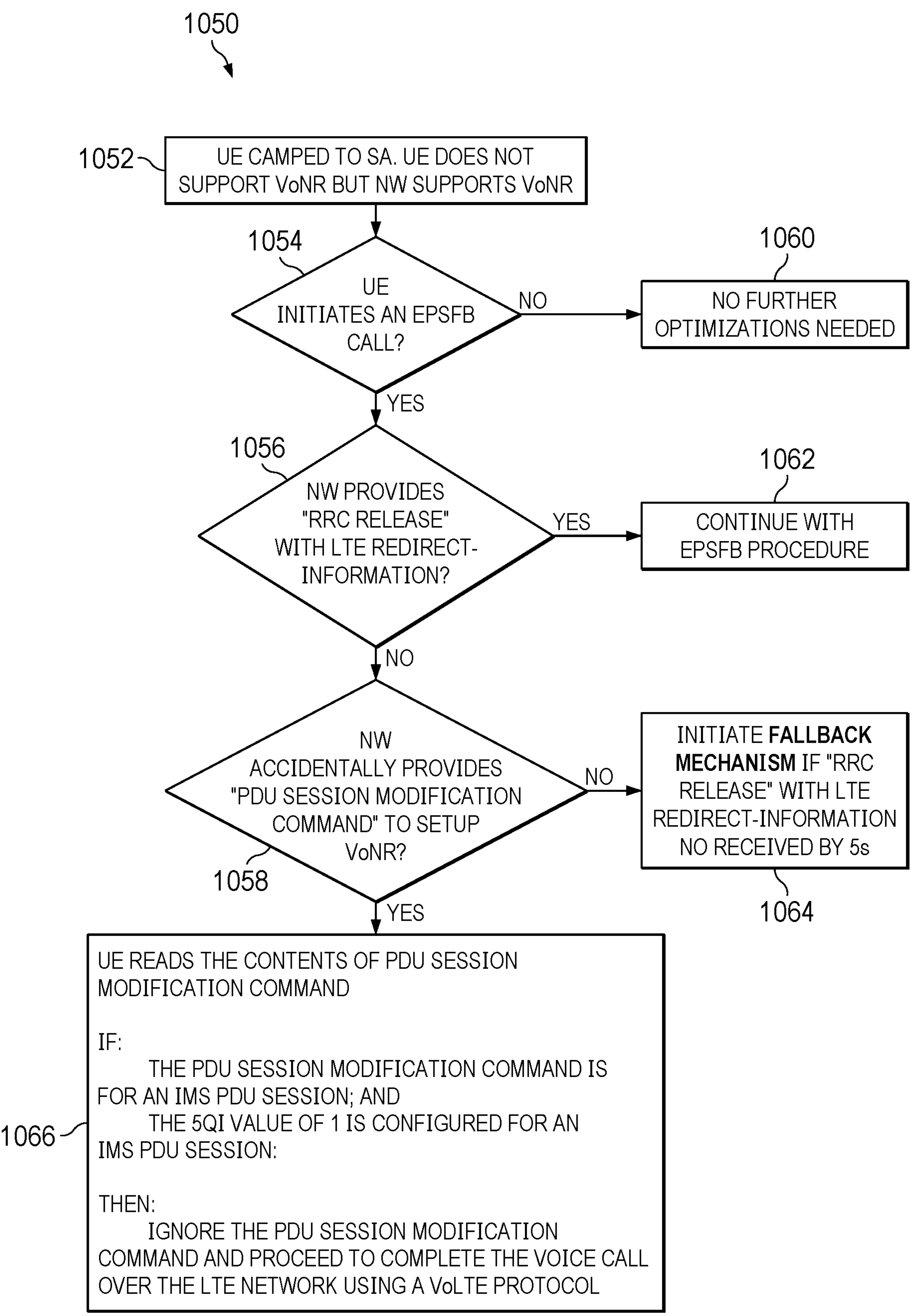
FIG. 10B illustrates a flow diagram detailing a method of handling voice call fallback when a non-VoNR-capable UE is camped to 5G SA on a network that supports VoNR, according to some aspects.

Turning now to FIG. 10B, a flow diagram 1050 detailing a method of handling voice call fallback when a non-VoNR-capable UE is camped to 5G SA on a network that supports VoNR is shown, according to some aspects. First, at block 1052, a non-VoNR-capable UE may be camped to 5G SA on a network that supports VoNR and, if the UE initiates an EPSFB voice call (i.e., "YES" at block 1054), then the method may proceed to block 1056 to determine whether the network has provided an RRC-Release message with LTE redirect-info. If the network has not provided LTE redirect-info (i.e., "NO" at block 1056), then the method may proceed to block 1058, wherein the network may accidentally provide the aforementioned PDU Session Modification Command to set up a VoNR call. If this command is accidentally provided to the UE (i.e., "YES" at block 1058), the UE may proceed to block 1066 to reads the contents of PDU Session Modification Command, and then, if the PDU Session Modification Command is for an IMS PDU Session; and the 5QI value of 1 is configured for an IMS PDU Session, the UE may simply ignore the PDU Session Modification Command and proceed to complete the voice call over the LTE network using a VoLTE protocol.

If, instead, at block 1054, the UE does not initiate an EPSFB voice call (i.e., "NO" at block 1054), then no further optimizations or enhancements are needed in this scenario. Returning now to block 1056, if the network does provide an RRC-Release message with LTE redirect-info (i.e., "YES" at block 1056), then the method may proceed to block 1062 and simply continue with the default EPSFB procedure. Returning now to block 1058, if the PDU Session Modification Command is not provided to the UE (i.e., "NO" at block 1058), the UE may proceed to block 1064, wherein the fallback mechanism may be initiated if the RRC Release message with the LTE redirect-info is not received in some predetermined amount of time, e.g., 5 seconds.

Exemplary Fallback Mechanisms

As has been described above, in some scenarios, a UE's optimal call processing logic should cause it to perform a fallback mechanism. For example, if the UE's current RAT is NR, then it may follow a desired NR fallback mechanism, and, if the UE's current RAT is LTE, then it may follow a desired LTE fallback mechanism.

According to some embodiments, a UE's desired NR fallback mechanism may take various inputs, such as the availability of an LTE RAT to fallback to, e.g., based on one or more of: a historical fingerprinting database, information hard-coded in a Code Block, an RRC-Release message (e.g., redirected-info), information from an NR SIB 5, or information downloaded from a server (e.g., an Entitlement Server). Based on the determination to fallback to LTE, the UE may: perform a local release in NR; perform the ATTACH/TAU procedure; and finally, set up the call as VoLTE.

Similarly, according to other embodiments, a UE's desired LTE fallback mechanism may take various inputs, such as the availability of a 2G/3G RAT to fallback to, e.g., based on one or more of: a historical fingerprinting database, information hard-coded in a Code Block, an RRC-Release message (e.g., redirected-info), information from an LTE SIB 6, or information downloaded from a server (e.g., an Entitlement Server). Based on the determination to fallback to 2G/3G, the UE may: initiate a CSFB procedure; perform the LAU/RAU procedure in 3G; and finally, set up the call as a circuit-switched (CS) call.

Figure 11:
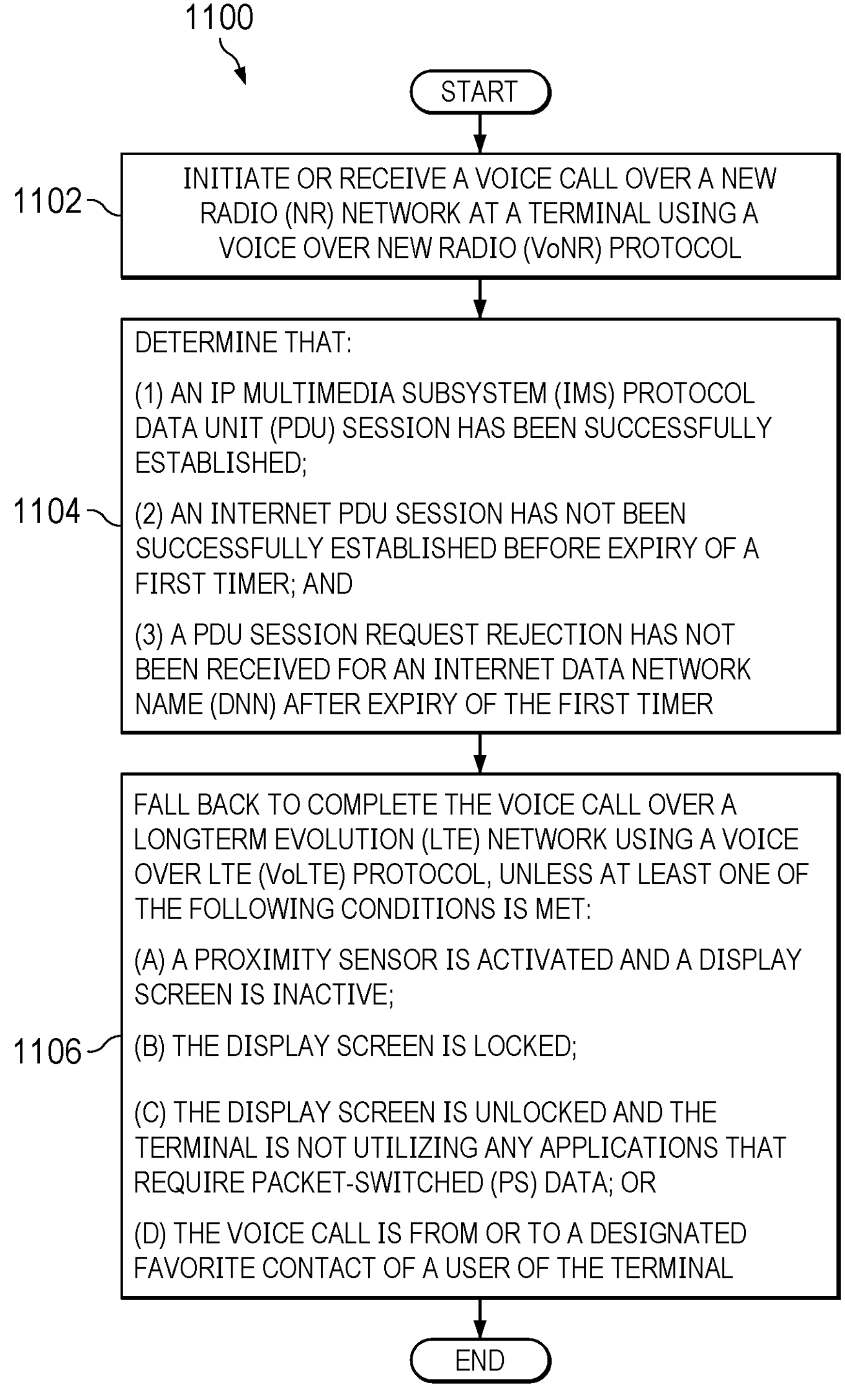
FIG. 11 is a flowchart detailing a method of handling voice call fallback on VoNR when an IMS PDU session is established but an Internet PDU session is not established, according to some aspects.

Exemplary Methods of Optimizing Simultaneous Voice and Data Experiences in Cellular Networks Across a Broad Range of Scenarios FIG. 11 is a flowchart 1100 detailing a method of handling voice call fallback on VoNR when an IMS PDU session is established but an Internet PDU session is not established, according to some aspects. First, at block 1102, a UE practicing the method of 1100 may initiate or receive a voice call over a NR network at a terminal using a VoNR protocol. Next, at block 1104, the UE may Determine that: (1) an IP Multimedia Subsystem (IMS) Protocol Data Unit (PDU) session has been successfully established; (2) an Internet PDU session has not been successfully established before expiry of a first timer; and (3) a PDU session request rejection has not been received for an Internet Data Network Name (DNN) after expiry of the first timer. In response to determining that conditions (1)-(3) are met at block 1104, the UE may proceed to block 1106, where it may fall back to complete the voice call over a Long-Term Evolution (LTE) network using a Voice over LTE (VoLTE) protocol, unless at least one of the following conditions is met: (a) a proximity sensor is activated and a display screen is inactive; (b) the display screen is locked; (c) the display screen is unlocked and the terminal is not utilizing any applications that require packet-switched (PS) data; or (d) the voice call is from or to a designated favorite contact of a user of the terminal. Note that other implementations may use other combinations or sub-combination of conditions (a)-(d) of block 1106 and/or modified conditions that are tailored to a given implementation design.

Figure 12:
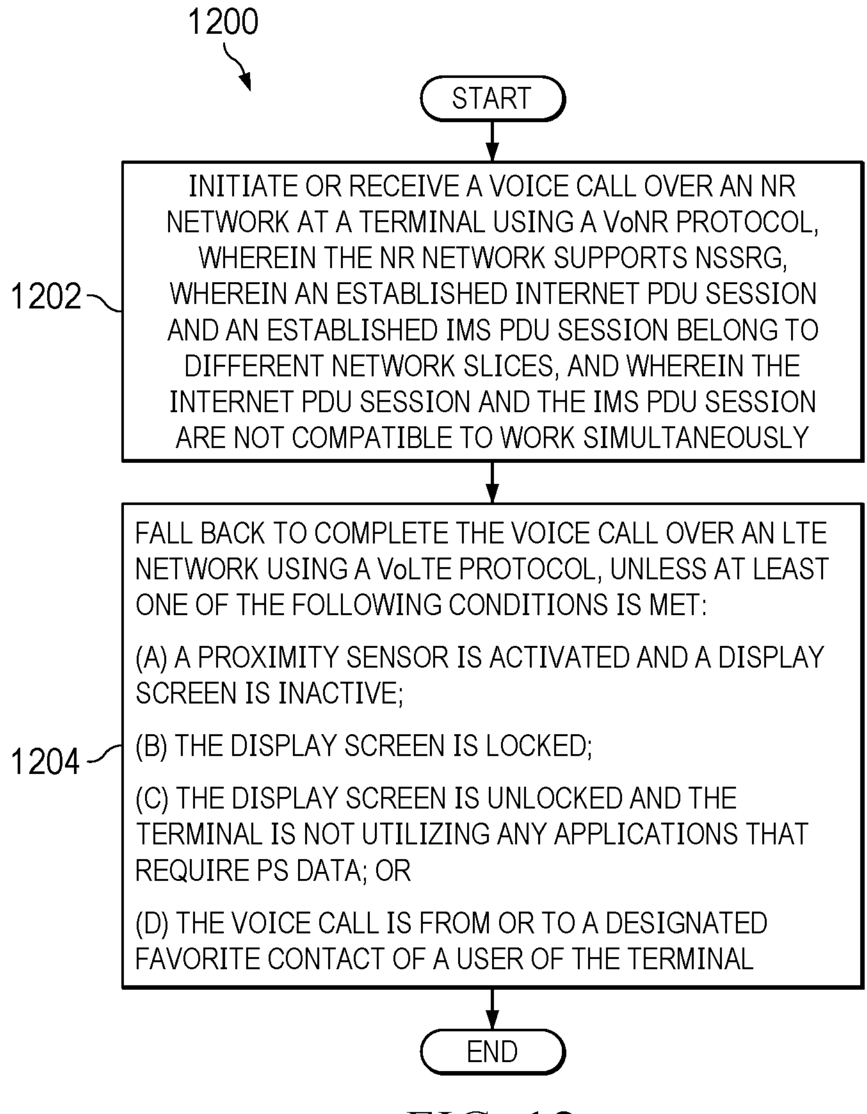
FIG. 12 is a flowchart detailing a method of handling voice call fallback on VoNR when an IMS PDU session and an Internet PDU session are established in different network slices but are not compatible to work simultaneously, according to some aspects.

FIG. 12 is a flowchart 1200 detailing a method of handling voice call fallback on VoNR when an IMS PDU session and an Internet PDU session are established in different network slices but are not compatible to work simultaneously, according to some aspects. First, at block 1202, a UE practicing the method of 1200 may initiate or receive a voice call over an NR network at a terminal using a VoNR protocol, wherein the NR network supports Network Slice Simultaneous Registration Group (NSSRG), wherein an established Internet PDU session and an established IMS PDU session belong to different network slices, and wherein the Internet PDU session and the IMS PDU session are not compatible to work simultaneously. Next, at block 1204, the UE may fall back to complete the voice call over an LTE network using a VoLTE protocol, unless at least one of the following conditions is met: (a) a proximity sensor is activated and a display screen is inactive; (b) the display screen is locked; (c) the display screen is unlocked and the terminal is not utilizing any applications that require PS data; or (d) the voice call is from or to a designated favorite contact of a user of the terminal. Note that other implementations may use other combinations or sub-combination of conditions (a)-(d) of block 1204 and/or modified conditions that are tailored to a given implementation design.

Figure 13:
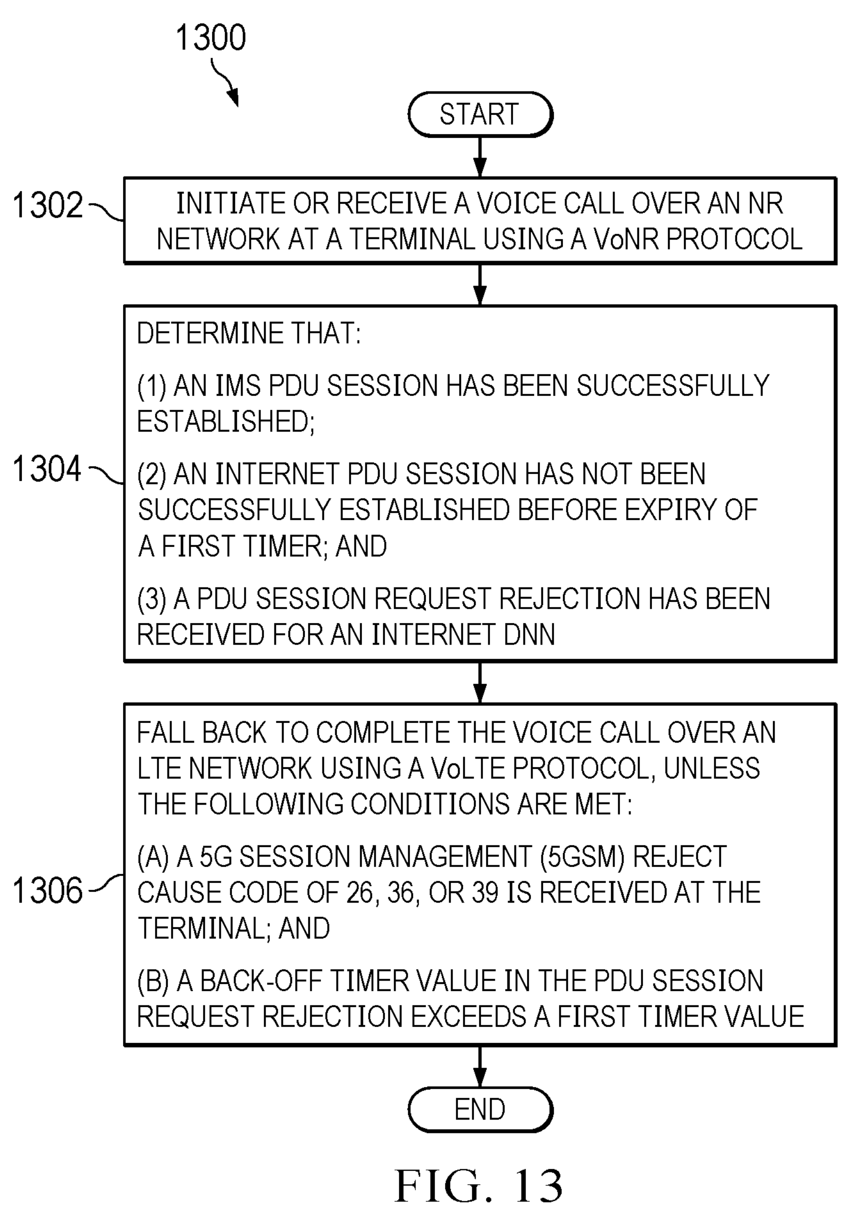
FIG. 13 is a flowchart detailing another method of handling voice call fallback on VoNR when an IMS PDU session is established but an Internet PDU session is not established, according to some aspects.

FIG. 13 is a flowchart 1300 detailing another method of handling voice call fallback on VoNR when an IMS PDU session is established but an Internet PDU session is not established, according to some aspects. First, at block 1302, a UE practicing the method of 1300 may initiate or receive a voice call over an NR network at a terminal using a VoNR protocol. Next, at block 1304, the UE may determine that: (1) an IMS PDU session has been successfully established; (2) an Internet PDU session has not been successfully established before expiry of a first timer; and (3) a PDU session request rejection has been received for an Internet DNN. In response to determining that conditions (1)-(3) are met at block 1304, the UE may proceed to block 1306, where it may fall back to complete the voice call over an LTE network using a VoLTE protocol, unless the following conditions are met: (a) a 5G Session Management (5GSM) reject cause code of 26, 36, or 39 is received at the terminal; and (b) a back-off timer value in the PDU session request rejection exceeds a first timer value. As described above with reference to FIG. 7C, cause 26 indicates insufficient resources; cause 36 indicates regular deactivation; and cause 39 indicates that reactivation is requested.

Figure 14:
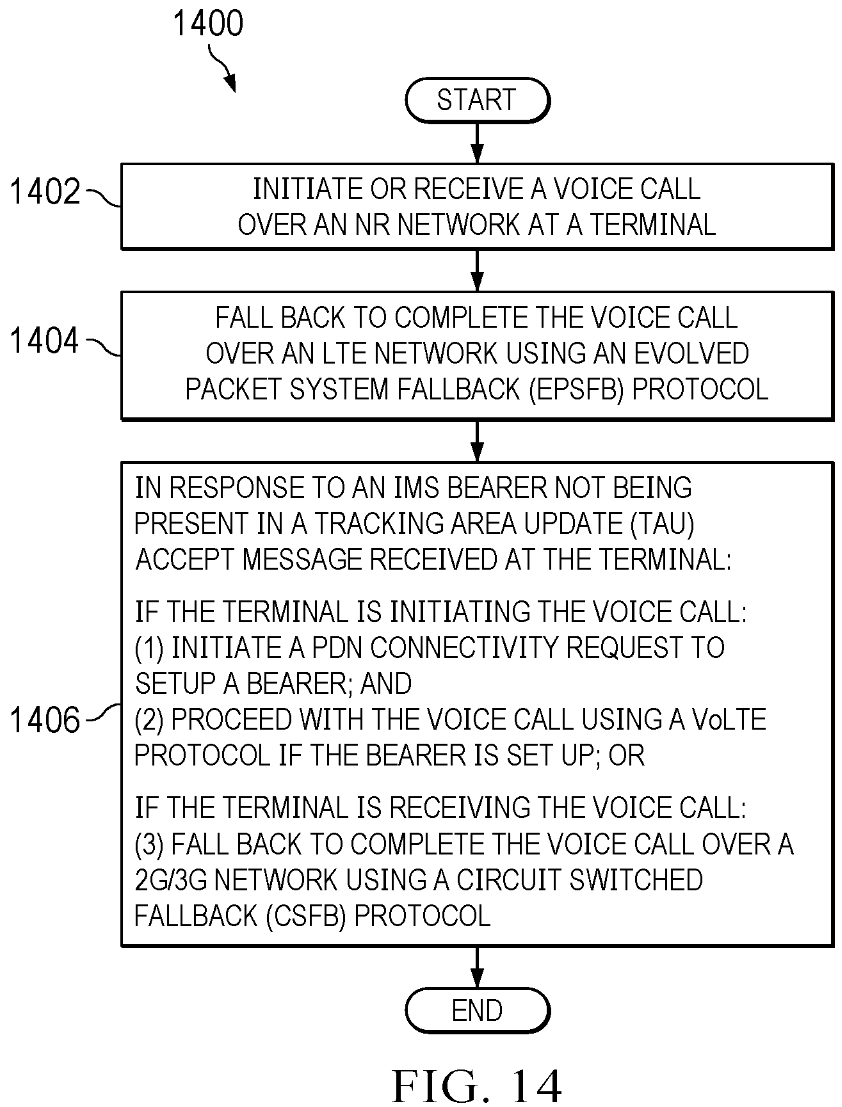
FIG. 14 is a flowchart detailing a method of handling voice call fallback on an LTE network after an EPSFB procedure has occurred and an IMS bearer is not present, according to some aspects.

FIG. 14 is a flowchart 1400 detailing a method of handling voice call fallback on an LTE network after an EPSFB procedure has occurred and an IMS bearer is not present, according to some aspects. First, at block 1402, a UE practicing the method of 1400 may initiate or receive a voice call over an NR network at a terminal. Next, at block 1404, the UE may fall back to complete the voice call over an LTE network using an Evolved Packet System Fallback (EPSFB) protocol. Then, at block 1406, and in response to an IMS bearer not being present in a Tracking Area Update (TAU) Accept message received at the terminal, the UE may follow one of two procedures, depending on whether it is initiating or receiving the voice call. For example, if the UE terminal is initiating the voice call, the UE may proceed to: (1) initiate a PDN Connectivity Request to setup a bearer; and (2) proceed with the voice call using a VoLTE protocol if the bearer is set up. If, instead, the UE terminal is receiving the voice call, the UE may proceed to: (3) fall back to complete the voice call over a 2G/3G network using a Circuit Switched Fallback (CSFB) protocol.

Figure 15:
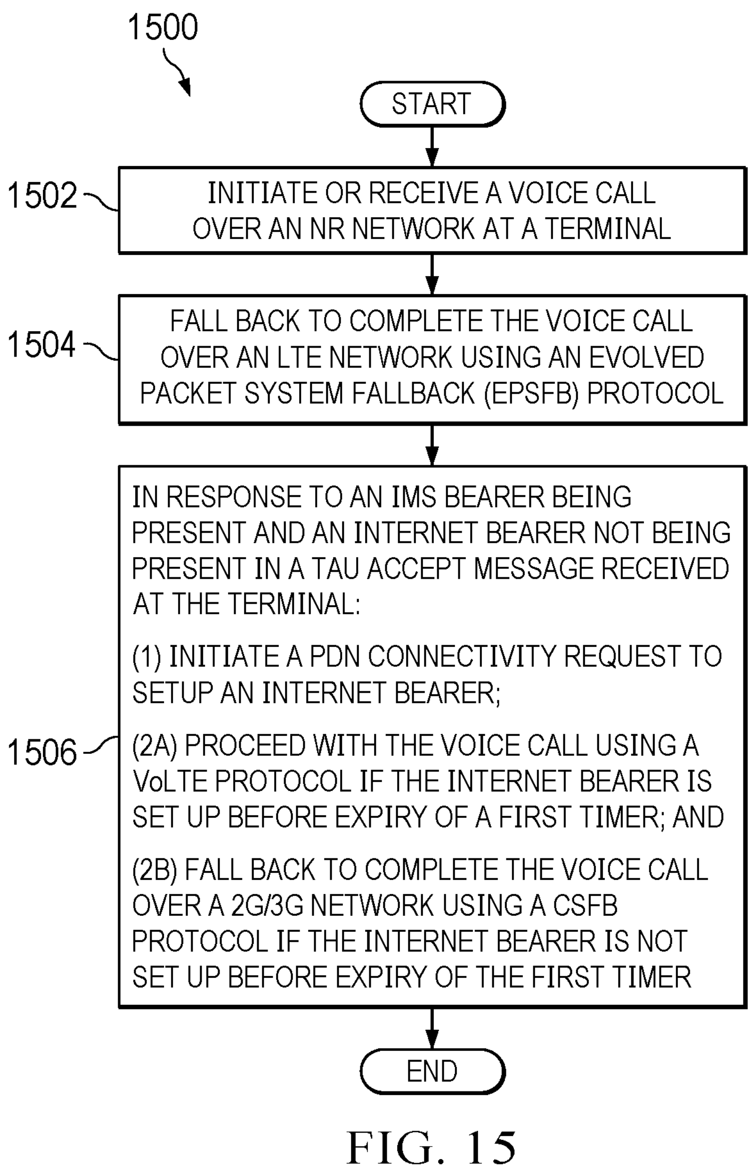
FIG. 15 is a flowchart detailing a method of handling voice call fallback on an LTE network after an EPSFB procedure has occurred and an IMS bearer is present but an Internet bearer is not present, according to some aspects.

FIG. 15 is a flowchart 1500 detailing a method of handling voice call fallback on an LTE network after an EPSFB procedure has occurred and an IMS bearer is present but an Internet bearer is not present, according to some aspects. First, at block 1502, a UE practicing the method of 1500 may initiate or receive a voice call over an NR network at a terminal. Next, at block 1504, the UE may fall back to complete the voice call over an LTE network using an EPSFB protocol. Then, at block 1506, and in response to an IMS bearer being present and an Internet bearer not being present in a TAU Accept message received at the UE terminal, the UE may follow the following procedures: (1) initiate a PDN Connectivity Request to setup an Internet bearer; and then either (2a) proceed with the voice call using a VoLTE protocol if the Internet bearer is set up before expiry of a first timer; or (2b) fall back to complete the voice call over a 2G/3G network using a CSFB protocol if the Internet bearer is not set up before expiry of the first timer.

Figure 16:
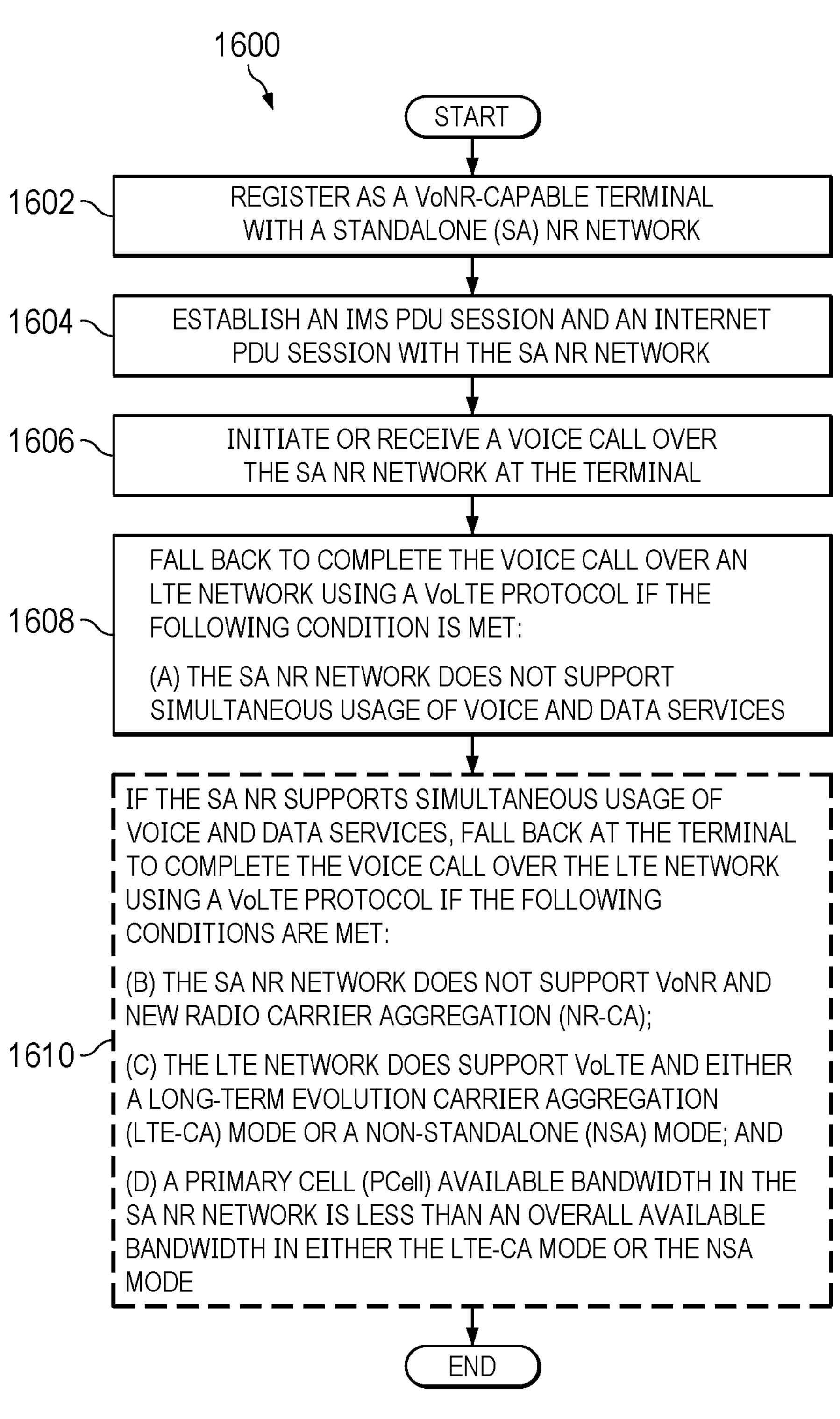
FIG. 16 is a flowchart detailing a method of handling voice call fallback on VoNR when a network does not support simultaneous voice and data services in SA, according to some aspects.

FIG. 16 is a flowchart 1600 detailing a method of handling voice call fallback on VoNR when a network does not support simultaneous voice and data services in SA, according to some aspects. First, at block 1602, a UE practicing the method of 1600 may register as a VoNR-capable terminal with a SA NR network. Next, at block 1604, the UE may establish an IMS PDU session and an Internet PDU session with the SA NR network. Next, at block 1606, the UE may initiate or receive a voice call over the SA NR network at the terminal.

At block 1608, the UE may fall back to complete the voice call over an LTE network using a VoLTE protocol if the following condition is met: (a) the SA NR network does not support simultaneous usage of voice and data services. If, instead, at block 1610, the SA NR network does support simultaneous usage of voice and data services, the UE terminal may fall back to complete the voice call over the LTE network using a VoLTE protocol if the following further conditions are met: (b) the SA NR network does not support VoNR and New Radio Carrier Aggregation (NR-CA); (c) the LTE network does support VoLTE and either a Long-Term Evolution Carrier Aggregation (LTE-CA) mode or a Non-Standalone (NSA) mode; and (d) a Primary Cell (PCell) available bandwidth in the SA NR network is less than an overall available bandwidth in either the LTE-CA mode or the NSA mode.

Figure 17:
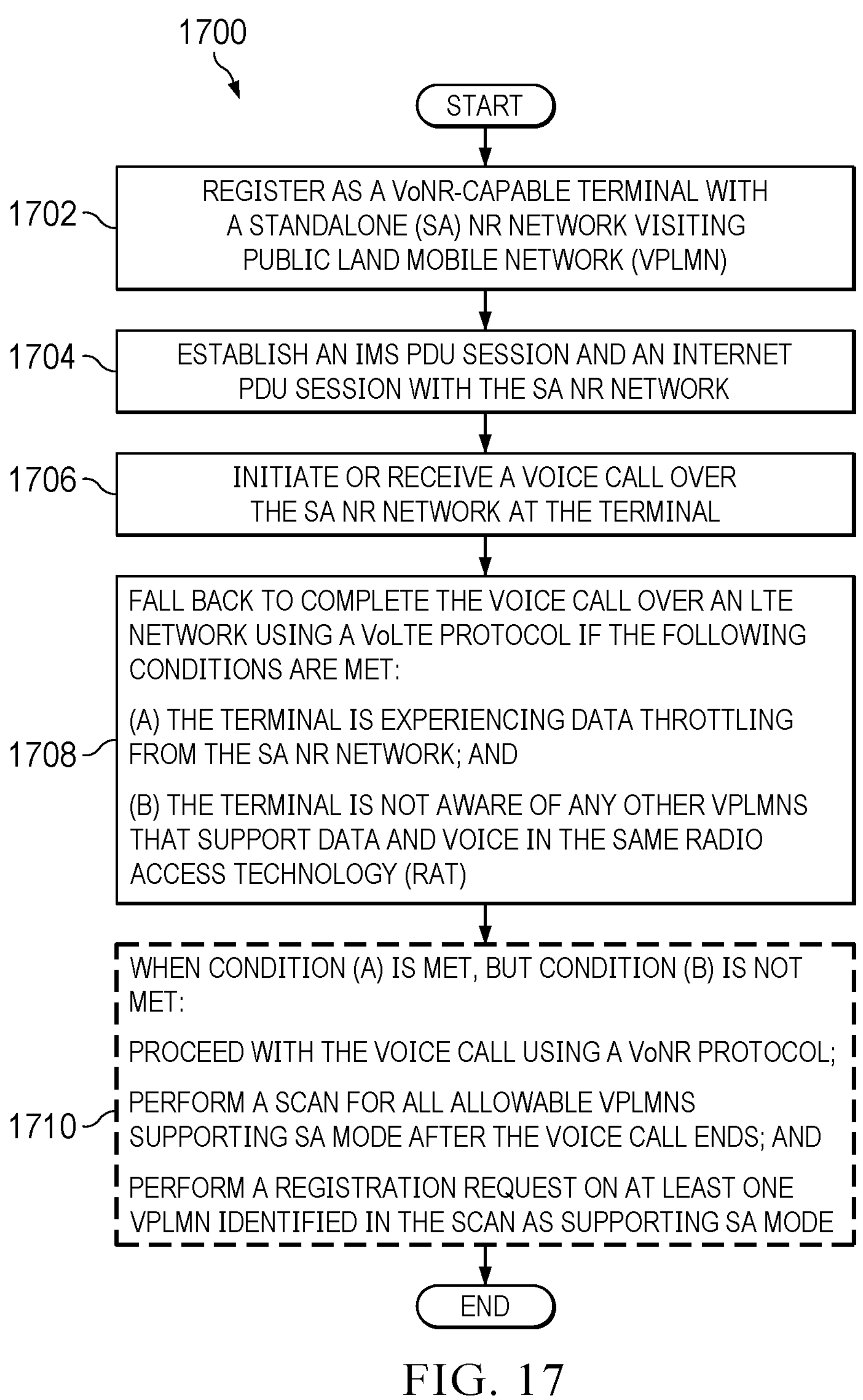
FIG. 17 is a flowchart detailing a method of handling voice call fallback when a VoNR-capable UE is camped to SA on a VPLMN, according to some aspects.

FIG. 17 is a flowchart 1700 detailing a method of handling voice call fallback when a VoNR-capable UE is camped to SA on a VPLMN, according to some aspects. First, at block 1702, a UE practicing the method of 1700 may register as a VoNR-capable terminal with a SA NR network Visiting Public Land Mobile Network (VPLMN). Next, at block 1704, the UE terminal may establish an IMS PDU session and an Internet PDU session with the SA NR network. Next, at block 1706, the UE may initiate or receive a voice call over the SA NR network at the terminal.

At block 1708, the UE may fall back to complete the voice call over an LTE network using a VoLTE protocol if the following conditions are met: (a) the terminal is experiencing data throttling from the SA NR network; and (b) the terminal is not aware of any other VPLMNs that support data and voice in the same Radio Access Technology (RAT).

Finally, at block 1710, when condition (a) of block 1708 is met, but condition (b) of block 1708 is not met, the UE terminals may take the following actions: proceed with the voice call using a VoNR protocol; perform a scan for all allowable VPLMNs supporting SA mode after the voice call ends; and perform a registration request on at least one VPLMN identified in the scan as supporting SA mode.

Figure 18:
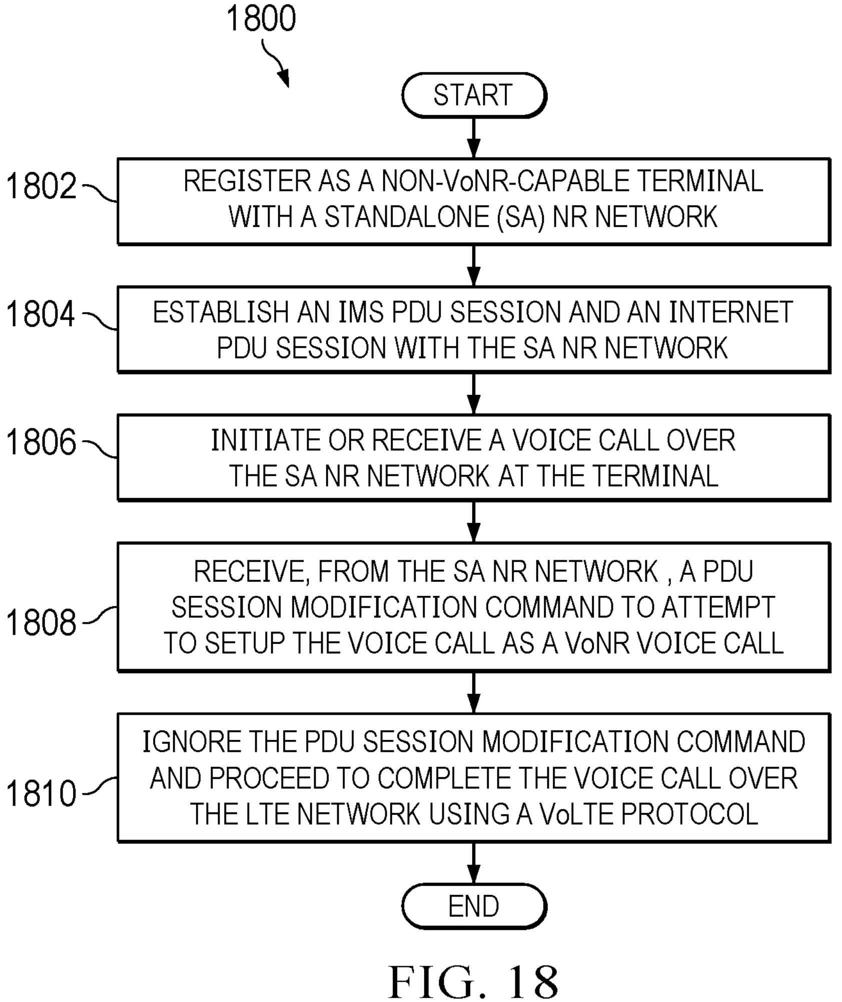
FIG. 18 is a flowchart detailing a method of handling voice call fallback when a non-VoNR-capable UE is camped to SA on a network that supports VoNR, according to some aspects.

FIG. 18 is a flowchart 1800 detailing a method of handling voice call fallback when a non-VoNR-capable UE is camped to SA on a network that supports VoNR, according to some aspects. First, at block 1802, a UE practicing the method of 1800 may register as a non-VoNR-capable terminal with a SA NR network. Next, at block 1804, the UE may establish an IMS PDU session and an Internet PDU session with the SA NR network. Next, at block 1806, the UE may initiate or receive a voice call over the SA NR network at the terminal.

Then, at block 1808, the UE may receive, from the SA NR network, a PDU Session Modification command to attempt to setup the voice call as a VoNR voice call. Finally, at block 1810, the UE may ignore the PDU Session Modification command and proceed to complete the voice call over the LTE network using a VoLTE protocol.

Additional Comments

The use of the connective term "and/or" is meant to represent all possible alternatives of the conjunction "and" and the conjunction "or." For example, the sentence "configuration of A and/or B" includes the meaning and of sentences "configuration of A and B" and "configuration of A or B."

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method (e.g., any of a method aspects described herein, or, any combination of the method aspects described herein, or any subset of any of the method aspects described herein, or any combination of such subsets).

In some aspects, a device (e.g., a UE 106, a BS 102) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A terminal comprising:

a receiver;

a proximity sensor;

a display screen; and a processor configured to:

initiate or receive a voice call over a New Radio (NR) network using a Voice over New Radio (VoNR) protocol; and in response to:

(1) an IP Multimedia Subsystem (IMS) Protocol Data Unit (PDU) session being successfully established;

(2) an Internet PDU session not being successfully established before expiry of a first timer; and (3) a PDU session request rejection not being received for an Internet Data Network Name (DNN) after expiry of the first timer:

fall back to complete the voice call over a Long-Term Evolution (LTE) network using a Voice over LTE (VoLTE) protocol, unless at least one of the following conditions is met:

(a) the proximity sensor is activated and the display screen is inactive;

(b) the display screen is locked;

(c) the display screen is unlocked and the terminal is not utilizing any applications that require packet-switched (PS) data; or (d) the voice call is from or to a designated favorite contact of a user of the terminal.

2. The terminal of claim 1, wherein, when any of conditions (a)-(d) are met, the processor is further configured to:

re-send a PDU session establishment request for the Internet DNN.

3. The terminal of claim 2, wherein, when any of conditions (a)-(d) are met, the processor is further configured to:

proceed with the voice call using the VoNR protocol.

4. The terminal of claim 1, wherein, in response to the Internet PDU session being successfully established before expiry of the first timer, the processor is further configured to:

proceed with the voice call using the VoNR protocol.

5. The terminal of claim 1, wherein the NR network does not support using Network Slice Simultaneous Registration Group (NSSRG) information.

6. The terminal of claim 1, wherein the NR network supports NSSRG, and wherein the Internet PDU session and the IMS PDU session belong to the same network slice.

7. The terminal of claim 1, wherein the NR network supports NSSRG, and wherein the Internet PDU session and the IMS PDU session are compatible to work simultaneously.

8. A method, comprising:

initiating or receiving, at a User Equipment (UE), a voice call over a New Radio (NR) network using a Voice over New Radio (VoNR) protocol; and in response to:

(1) an IP Multimedia Subsystem (IMS) Protocol Data Unit (PDU) session being successfully established;

(2) an Internet PDU session not being successfully established before expiry of a first timer; and (3) a PDU session request rejection not being received for an Internet Data Network Name (DNN) after expiry of the first timer:

falling back to complete the voice call over a Long-Term Evolution (LTE) network using a Voice over LTE (VoLTE) protocol, unless at least one of the following conditions is met:

(a) a proximity sensor of the UE is activated and a display screen of the UE is inactive;

(b) the display screen is locked;

(c) the display screen is unlocked and the UE is not utilizing any applications that require packet-switched (PS) data; or (d) the voice call is from or to a designated favorite contact of a user of the UE.

9. The method of claim 8, wherein, when any of conditions (a)-(d) are met, the method further comprises:

re-sending a PDU session establishment request for the Internet DNN; and proceeding with the voice call using the VoNR protocol.

10. The method of claim 8, wherein, in response to the Internet PDU session being successfully established before expiry of the first timer, the method further comprises:

proceeding with the voice call using the VoNR protocol.

11. The method of claim 8, wherein the NR network does not support using Network Slice Simultaneous Registration Group (NSSRG) information.

12. The method of claim 8, wherein the NR network supports NSSRG, and wherein the Internet PDU session and the IMS PDU session belong to the same network slice.

13. The method of claim 8, wherein the NR network supports NSSRG, and wherein the Internet PDU session and the IMS PDU session are compatible to work simultaneously.

14. A non-transitory computer-readable medium that stores instructions that, when executed, cause one or more processors of a User Equipment (UE) to cause the UE to:

initiate or receive a voice call over a New Radio (NR) network using a Voice over New Radio (VoNR) protocol; and in response to:

(1) an IP Multimedia Subsystem (IMS) Protocol Data Unit (PDU) session being successfully established;

(2) an Internet PDU session not being successfully established before expiry of a first timer; and (3) a PDU session request rejection not being received for an Internet Data Network Name (DNN) after expiry of the first timer:

fall back to complete the voice call over a Long-Term Evolution (LTE) network using a Voice over LTE (VoLTE) protocol, unless at least one of the following conditions is met:

(a) a proximity sensor of the UE is activated and a display screen of the UE is inactive;

(b) the display screen is locked;

(c) the display screen is unlocked and the UE is not utilizing any applications that require packet-switched (PS) data; or (d) the voice call is from or to a designated favorite contact of a user of the UE.

15. The non-transitory computer-readable medium of claim 14, wherein, when any of conditions (a)-(d) are met, the one or more processors further cause the UE to:

re-send a PDU session establishment request for the Internet DNN.

16. The non-transitory computer-readable medium of claim 15, wherein, when any of conditions (a)-(d) are met, the one or more processors further cause the UE to:

proceed with the voice call using the VoNR protocol.

17. The non-transitory computer-readable medium of claim 14, wherein, in response to the Internet PDU session being successfully established before expiry of the first timer, the one or more processors further cause the UE to:

proceed with the voice call using the VoNR protocol.

18. The non-transitory computer-readable medium of claim 14, wherein the NR network does not support using Network Slice Simultaneous Registration Group (NSSRG) information.

19. The non-transitory computer-readable medium of claim 14, wherein the NR network supports NSSRG, and wherein the Internet PDU session and the IMS PDU session belong to the same network slice.

20. The non-transitory computer-readable medium of claim 14, wherein the NR network supports NSSRG, and wherein the Internet PDU session and the IMS PDU session are compatible to work simultaneously.

* * * * *